(12) United States Patent
Tanimoto et al.

(10) Patent No.: US 7,907,498 B2
(45) Date of Patent: Mar. 15, 2011

(54) OPTICAL PICKUP AND OPTICAL DISK DRIVE USING SAME

(75) Inventors: Takeshi Tanimoto, Saitama (JP); Kazumasa Kaneda, Shizuoka (JP)

(73) Assignee: Sony Corporation, Tokyo (JP)

( * ) Notice: Subject to any disclaimer, the term of this patent is extended or adjusted under 35 U.S.C. 154(b) by 1580 days.

(21) Appl. No.: 11/227,227

(22) Filed: Sep. 16, 2005

(65) Prior Publication Data

US 2006/0067196 A1 Mar. 30, 2006

(30) Foreign Application Priority Data

Sep. 27, 2004 (JP) ................................. 2004-280115
Mar. 7, 2005 (JP) ................................. 2005-063073

(51) Int. Cl.
*G11B 7/12* (2006.01)
(52) U.S. Cl. ................................. 369/112.02; 369/44.32
(58) Field of Classification Search ................ 369/44.32, 369/53.12, 112.01, 112.02
See application file for complete search history.

(56) References Cited

U.S. PATENT DOCUMENTS

| | | | | |
|---|---|---|---|---|
| 6,130,872 A * | 10/2000 | Sugiura et al. | ........... | 369/112.04 |
| 6,449,236 B2 * | 9/2002 | Wals et al. | ............... | 369/112.02 |
| 6,496,452 B2 * | 12/2002 | Stallinga et al. | ........... | 369/44.23 |
| 6,586,717 B2 | 7/2003 | Vrehen et al. | | |
| 6,909,686 B2 * | 6/2005 | Iwasaki et al. | ........... | 369/112.02 |
| 7,054,253 B1 * | 5/2006 | Nomura et al. | .......... | 369/112.02 |
| 2001/0028028 A1 * | 10/2001 | Iwasaki et al. | ................. | 250/216 |
| 2001/0033541 A1 * | 10/2001 | Iwasaki et al. | ........... | 369/112.02 |
| 2002/0105889 A1 * | 8/2002 | Ogasawara et al. | ....... | 369/112.02 |
| 2002/0191502 A1 * | 12/2002 | Hirai | ........................ | 369/44.24 |
| 2008/0055713 A1 | 3/2008 | Ogasawara et al. | | |

FOREIGN PATENT DOCUMENTS

| | | |
|---|---|---|
| JP | 9-128785 | 5/1997 |
| JP | 10-289465 | 10/1998 |
| JP | 2001-84631 | 3/2001 |
| JP | 2002-50068 | 2/2002 |
| JP | 2003-173562 | 6/2003 |
| JP | 2003-518702 | 6/2003 |
| JP | 2003-338070 | 11/2003 |
| WO | WO 2005/106865 A1 | 11/2005 |

* cited by examiner

*Primary Examiner* — Wayne R Young
*Assistant Examiner* — Thomas D Alunkal
(74) *Attorney, Agent, or Firm* — Oblon, Spivak, McClelland, Maier & Neustadt, L.L.P.

(57) ABSTRACT

Spherical aberration, astigmatism and coma can be corrected by a single liquid-crystal optical element, the electrode patterns in the optical element can be simplified, and the optical element can be controlled in a simple manner. The present invention provides an optical pickup including a light source to emit a light beam of a predetermined wavelength, an objective lens to focus the light beam emitted from the light source onto the signal recording surface of an optical disk, a liquid-crystal optical element provided between the light source and objective lens to correct spherical aberration, astigmatism and coma by varying the refractive index thereof, and a photodetector to detect return light from the signal recording surface of the optical disk. The liquid-crystal optical element has a pair of electrodes disposed opposite to each other in the optical-axial direction, and the liquid-crystal optical element has a pattern to correct spherical aberration, pattern to correct astigmatism and a pattern to correct coma, and the patterns are disposed dispersedly on the pair of electrodes to divide the electrode pair into a plurality of zones, and the plurality of zones resulted from division of the electrode pair by the patterns are used in combination to correct the spherical aberration, astigmatism and coma.

15 Claims, 14 Drawing Sheets

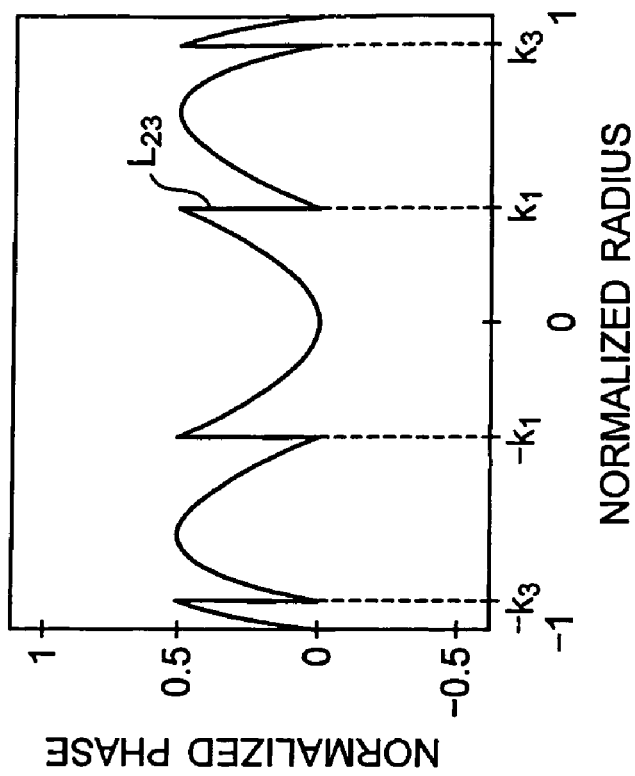
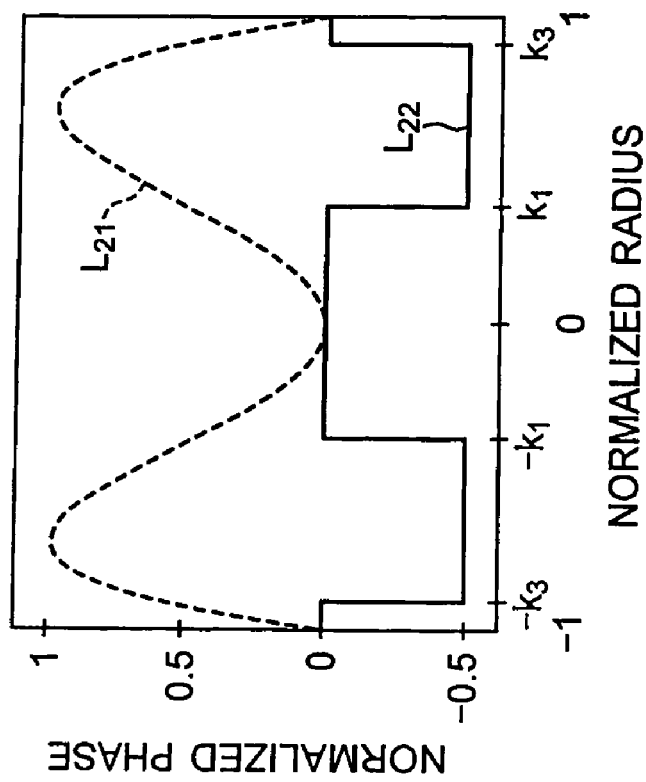
FIG. 12B
FIG. 12A

OPTICAL PICKUP AND OPTICAL DISK DRIVE USING SAME

CROSS REFERENCES TO RELATED APPLICATIONS

The present invention contains subject matter related to Japanese Patent Application JP 2004-280115 filed in the Japanese Patent Office on Sep. 27, 2004, and Japanese Patent Application JP 2005-063073 filed in the Japanese Patent Office on Mar. 7, 2005, the entire contents of which are incorporated herein by reference.

BACKGROUND OF THE INVENTION

1. Field of the Invention

The present invention relates to an optical pickup that records and/or reproduces information to and/or from an information recording medium such as an optical disk, and an optical disk using the optical pickup.

2. Description of the Related Art

An optical pickup is well known in which liquid-crystal optical elements are used to correct spherical aberration, astigmatism and coma, respectively. For example, there is known a liquid-crystal optical element having a spherical aberration-correction electrode pattern 201 as shown in FIG. 1, a liquid-crystal optical element having an astigmatism-correcting electrode pattern 211 as shown in FIG. 2, a liquid-crystal optical element having a coma-correcting electrode pattern 221 as shown in FIG. 3, and an optical pickup including those elements.

The electrode pattern 201 has a plurality of concentric boundaries 202a and 202b that divide an electrode having the electrode pattern 201 provided thereon into a plurality of zones as shown in FIG. 1. The electrode pattern 211 has a circular boundary 212a and a plurality of radial boundaries 212b to 212i provided outside the boundary 212a, these boundaries dividing an electrode having the electrode pattern 211 provided thereon into a plurality of zones as shown in FIG. 2. Also, the electrode pattern 221 has a plurality of boundaries 222a to 222d that divide an electrode having the electrode pattern 221 provided thereon into a plurality of zones as shown in FIG. 3.

The liquid-crystal optical element includes two electrodes and a layer of liquid crystal molecules aligned between the two electrodes. Each of the two electrodes has formed thereon any of the above-mentioned electrode patterns. By controlling a voltage applied to the electrode pattern, the alignment of the liquid crystal molecules can be biased correspondingly to an electric field arisen by the applied voltage to change the refractive power, thereby correcting a desired one of the aberrations.

In such an optical pickup, since the liquid-crystal optical element includes only two electrodes, the electrode pattern can correct only two of the spherical aberration, astigmatism and coma as selected. Namely, since one liquid-crystal optical element cannot cover all such aberrations, another liquid-crystal optical element has to be additionally provided to correct all the aberrations.

However, addition of the liquid-crystal optical element to the optical pickup adds to the number of parts and makes it necessary to provide a circuit that drives the additional liquid-crystal optical element and the like. Therefore, the optical pickup including the increased number of parts will be complicated in structure and expensive.

Also, there is an optical pickup including a liquid-crystal optical element having an electrode pattern that corrects two aberrations, for example, spherical aberration and astigmatism.

In the optical pickup, however, since a pattern to correct the spherical aberration and astigmatism is formed on one of the electrodes of the liquid-crystal optical element, radial and circumferential parting lines have to be provided on the outer surface of the electrode.

Thus, in such an optical pickup, the number of zones resulted from division by the electrode pattern is increased and each of the zones has to be driven by controlling both the amounts of correction of spherical aberration and astigmatism. Namely, the number of zones to be driven independently and thus a complicated drive circuit is required to drive the liquid-crystal optical element.

Also, an optical pickup is proposed in which a transparent liquid-crystal electrode is zoned vertically and horizontally to correct aberrations (as in the Japanese Patent Application JP 1997-128785).

In such an optical pickup, however, the liquid crystal drive circuit is complicated and hence cannot be controlled in any simple manner. Also, since the transparent electrode is divided in many zones, the number of boundaries between the zones is increased, resulting in a lower efficiency of aberration correction.

SUMMARY OF THE INVENTION

It is therefore desirable to overcome the above-mentioned drawbacks of the related art by providing an optical pickup capable of correcting spherical aberration, astigmatism and coma by a single liquid-crystal optical element whose electrode patterns are simple and that can be driven under a simpler control, and an optical disk drive using the optical pickup.

According to the present invention, there is provided an optical pickup including: a light source to emit a light beam of a predetermined wavelength; an objective lens to focus the light beam emitted from the light source onto the signal recording surface of an optical disk; a liquid-crystal optical element provided between the light source and objective lens to correct spherical aberration, astigmatism and coma by varying the refractive index thereof; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, pattern to correct astigmatism and a pattern to correct coma, the patterns being disposed dispersedly on the pair of electrodes to divide the electrode pair into a plurality of zones, and the plurality of zones resulted from division of the electrode pair by the patterns being used in combination to correct the spherical aberration, astigmatism and coma.

Also, according to the present invention, there is provided an optical pickup for recording and/or reproducing information to and/or from a first optical disk of one type and a second optical disk of the other type, the optical pickup including: a first light source to emit a light beam of a first wavelength; a second light source to emit a light beam of a second wavelength different from the first wavelength; an objective lens to focus the light beam emitted from the first or second light source onto the signal recording surface of the optical disk; a liquid-crystal optical element provided between the first and second light sources and the objective lens to correct spherical aberration, astigmatism and coma by varying the refractive index thereof; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, pattern to correct astigmatism and a pattern to correct coma, the patterns being disposed dispersedly on the pair of electrodes to divide the electrode pair into a plurality of zones, and the plurality of zones resulted from division of the electrode pair by the patterns being used in combination to correct the spherical aberration, astigmatism and coma.

Also, according to the present invention, there is provided an optical disk drive including an optical pickup to record and/or reproduce information to an optical disk, and a disk rotation driving unit for rotating the optical disk, the optical pickup being any one of the aforementioned optical pickups.

The optical pickup and optical disk drive according to the present invention can correct spherical aberration, astigmatism and coma optimally by a single liquid-crystal optical element without any complicated electrode pattern and drive control of the liquid-crystal optical element, and hence can record and reproduce information with an improved performance.

BRIEF DESCRIPTION OF THE DRAWINGS

FIG. 12A shows a phase distribution of spherical aberrations occurring in the second light beam and a second spherical aberration-correcting phase difference amount added by the liquid-crystal optical element to the second optical beam, in the optical pickup according to the present invention, and FIG. 12B shows a phase difference amount when the second spherical aberration-correcting phase difference amount is added to the spherical aberration occurring in the second light beam;

DETAILED DESCRIPTION OF THE PREFERRED EMBODIMENTS

Figure 1:
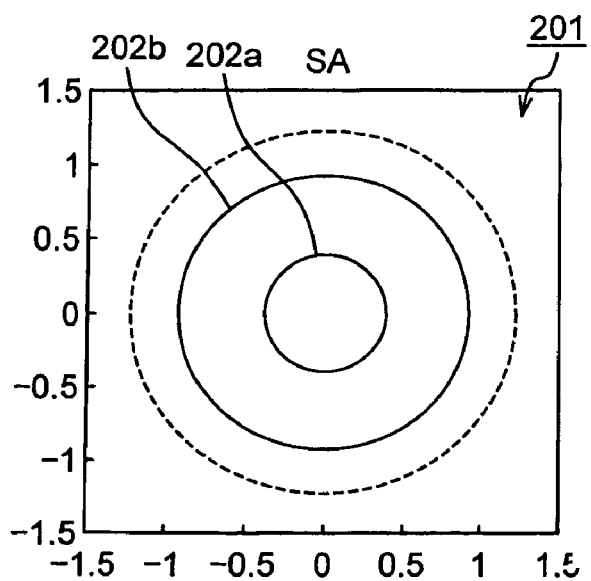
FIG. 1 is a plan view of a spherical aberration-correcting electrode pattern in the liquid-crystal optical element included in the conventional optical pickup.

The present invention will be described in detail below concerning an optical disk drive embodiment according to the present invention with reference to the accompanying drawings:

The optical disk drive, generally indicated with a reference numeral 10, is adapted to record and/or reproduce information signal to two types of optical disks 11 different in format from each other. A compact disk (CD) to which and/or from which the optical disk drive 10 records and/or reproduces information with a light beams of 785 nm in wavelength is used as the first one (will be referred to with a reference numeral 3 hereafter wherever necessary) of the optical disks 11, and a digital versatile disk (DVD) to which and/or from which the optical disk drive 10 records and/or reproduces information with a light beams of 655 nm in wavelength is used as the second one (will be referred to with a reference numeral 4 hereafter wherever necessary).

More specifically, the optical disk drive 10 includes a spindle motor 12 to rotate the optical disk 11, motor control circuit 13 to control the spindle motor 12, optical pickup 1 that irradiates a light beam to the optical disk 11 being rotated by the spindle motor 12 and detects return light from the optical disk 11, RF amplifier 15 to amplify an electrical signal supplied from the optical pickup 1, servo circuit 16 to generate a focusing servo signal and tracking servo signal for an objective lens, and a subcode extraction circuit 17 to extract subcode data.

Also the optical disk drive 10 includes a recording system consisting of an input terminal connected to a host device such as a personal computer or the like and that is supplied with data to be recorded to the optical disk 11, error-correcting encoding circuit 19 to make error-correcting encoding of the to-be-recorded data supplied to the input terminal 18, modulation circuit 20 to modulate the data subjected to the error-correction encoding, and a record processing circuit 21 to process the modulated to-be-recorded data for recording to the optical disk 11.

The optical disk drive 10 additionally includes a playing system consisting of a demodulation circuit 22 to demodulate data reproduced from the optical disk 11, error-correcting decoding circuit 23 to make error-correcting decoding of the demodulated reproduced data, and an output terminal 24 to provide the data subjected to the error-correcting decoding as output. The optical disk drive 10 further includes a user's control unit 25 to input a control signal to the optical disk drive 10, memory 26 to store various control data and the like, control circuit 27 to control the entire drive, and a disk type discriminator 29 to discriminate the type of the optical disk 11.

The spindle motor 12 has provided on the spindle thereof a disk table on which the optical disk 11 is mounted. It rotates the optical disk 11 mounted on the disk table. The motor control circuit 13 controls the spindle motor 12 to rotate the optical disk at a CLV (constant linear velocity). More particularly, the motor control circuit 13 controls the spindle motor 12 on the basis of a reference lock from a crystal oscillator and a clock supplied from a PLL circuit to rotate the optical disk 11 at a CLV. It should be noted that the motor control circuit 13 may be adapted to control the spindle motor 12 for rotating the optical disk 11 at a CLV, CAV (constant angular velocity) or a combination of a CLV and CAV.

The optical pickup 1 has an optical system that emits a light beam of a wavelength for each of various optical disks 11, mounted on the disk table. It has, for example, an optical system compatible with two light beams of different wavelengths. The optical pickup 1 includes a light source such as a semiconductor laser or the like to emit light beams different in wavelength from each other to the signal recording surface of the optical disks complying to different standards, objective lens having a numerical aperture for each type of the optical disks 11 and that focuses a light beam emitted from the light source, and a photodetector to detect return light from the optical disk 11. When reproducing data recorded in the optical disk 11, the optical pickup 1 sets the output of the semiconductor laser to a standard level and controls the semiconductor laser to emit a laser beam. Also, when recording to-be-recorded data to the optical disk 11, the optical pickup 1 sets the output of the semiconductor laser to a recording level higher than the standard level for data reproduction, and controls the semiconductor laser to emit a laser beam. Namely, for recording and/or reproducing data to the optical disk 11, the optical pickup 1 irradiates a light beam to the optical disk 11 and detects return light from the signal recording surface of the optical disk 11 by the photodetector which will make photoelectric conversion of the detected light. The objective lens is supported on an objective lens driving mechanism such as a biaxial actuator or the like, and moved in a focusing direction parallel with the optical axis of the objective lens on the basis of a focusing servo signal and in a tracking direction perpendicular to the optical axis of the objective lens on the basis of a tracking servo signal. It should be noted that the semiconductor laser, objective lens, photodetector, etc. will be described in detail later concerning their construction.

The RF amplifier 15 generates an RF signal, focus error signal and tracking error signal on the basis of an electrical signal supplied from the photodetector included in the optical pickup 1. For example, the focus error signal is generated by the astigmatism method, and the tracking error signal is generated by the 3-beam method or push-pull method. When the optical pickup 1 reproduces information from the optical disk 11, the RF amplifier 15 supplies an RF signal to the demodulation circuit 22 and focusing and tracking error signals to the servo circuit 16.

The servo circuit 16 generates a servo signal for use to reproduce the optical disk 11. More specifically, the servo circuit 16 generates a focusing servo signal on the basis of a focus error signal supplied from the RF amplifier 15 so that the focus error signal becomes zero, and a tracking servo signal on the basis of a tracking error signal supplied from the RF amplifier 15 so that the tracking error signal becomes zero. Then, the servo circuit 16 supplies the focusing and tracking servo signals to a drive circuit in the objective lens driving mechanism included in the optical pickup 1. The drive circuit drives the biaxial actuator on the basis of the focusing servo signal to move the objective lens in a focusing direction parallel with the optical axis of the objective lens and the biaxial actuator on the basis of the tracking servo signal to move the objective lens in a tracking direction perpendicular to the optical axis of the objective lens.

The subcode extraction circuit 17 extracts subcode data from the RF signal supplied from the RF amplifier 15 and supplies the extracted subcode data to the control circuit 27 that will identify address data etc.

The input terminal 18 is electrically connected to an interface of a host device such as personal computer or the like. The interface is, for example, SCSI (small computer system interface), ATAPI (advanced technology attachment packet interface), USB (universal serial bus), IEEE (Institute of Electrical and Electronic Engineers) 1394 interface or the like. Thus, the input terminal 18 is supplied with to-be-recorded data such as audio data, movie data, computer program, computer-processed data or the like, and supplies the input to-be-recorded data to the error-correcting encoding circuit 19.

The error-correcting encoding circuit 19 makes error-correcting encoding such as cross interleave Reed-Solomon code (CIRC), Reed-Solomon Product encoding or the like, and supplies the to-be-recorded data subjected to the error-correcting encoding to the modulation circuit 20. The modulation circuit 20 stores a conversion table such as 8-14 modulation, 8-16 modulation and the like. It converts input 8-bit to-be-recorded data into 14 bits or 16 bits, and supplies the data to the record processing circuit 21. The record processing circuit 21 makes Non-return to Zero (NRZ) processing, Non-return to Zero Inverted (NRZI) processing, etc. and record-compensation processing of the to-be-recorded data supplied from the modulation circuit 20, and supplies the data to the optical pickup 1.

The demodulation circuit 22 stores a conversion table similar to that in the modulation circuit 20. It converts an RF signal supplied from the RF amplifier 15 from 14 or 16 bits to 8 bits, and supplies the converted 8-bit reproduced data to the error-correcting decoding circuit 23. The error-correcting decoding circuit 23 makes error-correcting decoding of the data supplied from the demodulation circuit 22 and delivers the data at the output terminal 24. The output terminal 24 is electrically connected to the interface of the aforementioned host device. The reproduced data delivered at the output terminal 24 is displayed on a monitor connected to the host device and reproduced by a speaker into a sound.

The user's control unit 25 generates various kinds of control signals for use to control the optical disk drive 10, and supplies them to the control circuit 27. More specifically, the user's control unit 25 includes an eject button 25a provided at the optical disk drive 10 as well as a record button 25b to start recording of to-be-recorded data to the optical disk 11 mounted on the disk table, a play button 25c to start reproduction of data recorded in the optical disk 11, and a stop button 25d to stop recording/playing operation. These record button 25b, play button 25c, stop button 25d, etc. may not always be provided along with the eject button 25a at the optical disk drive 10, but a record start signal, play start signal, stop signal, etc. may be supplied to the control circuit 27 from the host device via the interface by operating, for example, a keyboard, mouse or the like of the host device.

The memory 26 is for example an erasable programmable read-only memory (EP-ROM). It has stored therein various control data and programs the control circuit 27 performs. More particularly, the memory 26 has stored therein various control data for controlling a thread motor 28 as a drive to move the optical pickup 1 radially of the optical disk 11 correspondingly to the type of each optical disk 11.

The disk type discriminator 29 discriminates the type of the optical disk 11 by detecting the format of the optical disk 11 on the basis of surface reflectance, shape, profile, etc. of the optical disk 11. Each of the blocks forming together the optical disk drive 10 is designed to make signal processing based on the specification of an optical disk set in the optical disk drive 10 correspondingly to the result of detection from the disk type discriminator 29.

The control circuit 27 is composed of a microcomputer, CPU, etc. to control the operation of the entire optical disk drive correspondingly to a control signal from the user's control unit 25. Also, the control circuit 27 makes a selection between semiconductor-laser light sources in the optical pickup 1 and also between output powers of the light sources correspondingly to the type of an optical disk 11 identified by the disk type discriminator 29.

Next, there will be illustrated and described the aforementioned optical pickup 1 according to the present invention.

Figure 5:
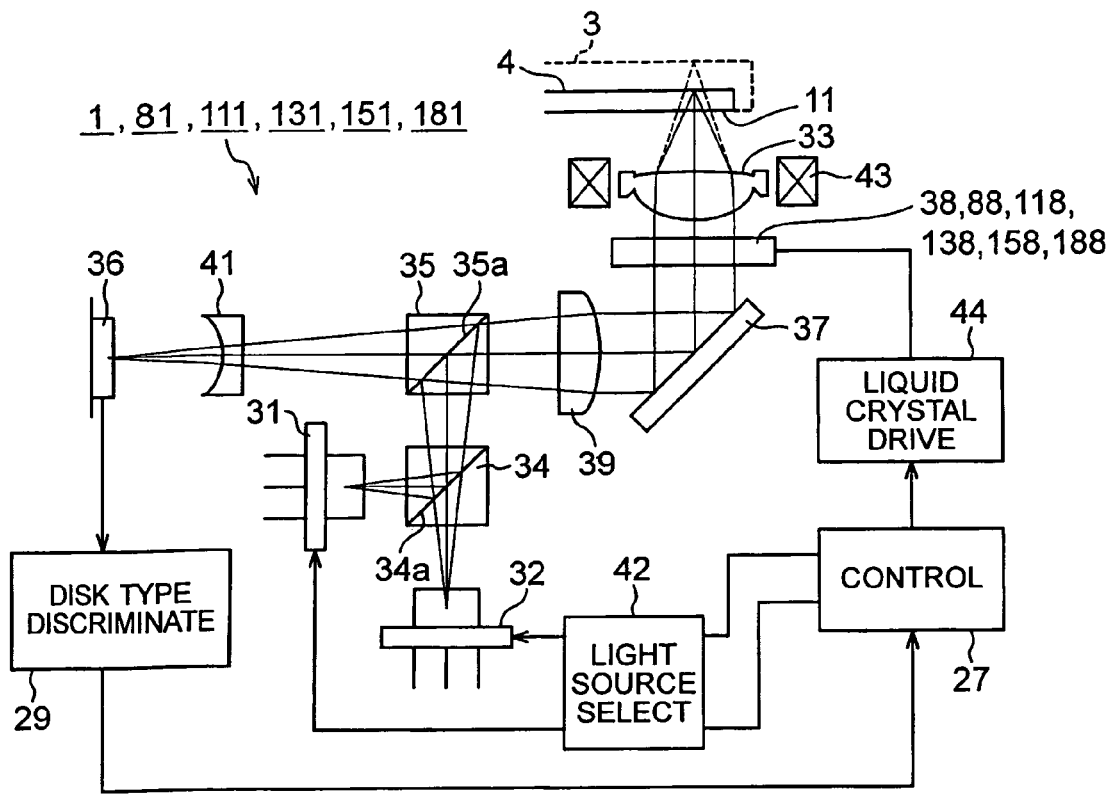
FIG. 5 is a light-path diagram showing an example of an optical system included in the optical pickup according to the present invention.

As shown in FIG. 5, the optical pickup 1 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and join the optical path of the first light beam to that of the second light beam emitted from the second light source 32, a second beam splitter 35 as an optical path splitting means to change and guide the optical paths of the first and second light beams, joined together by the first beam splitter 34, to the objective lens 33 and split the optical path of the return light from the optical disk from that of the first or second light beam emitted from the first or second light source 31 or 32 and traveling forward, and a photodetector 36 to detect the return light split by the second beam splitter 35 from the forward traveling light beam.

Also, the optical pickup 1 includes a mirror 37 as an upward reflecting means provided between the objective lens 33 and second beam splitter 35 to reflect the first and second light beams at about 90 deg. toward the objective lens 33, a liquid-crystal optical element 38 provided between the mirror 37 and objective lens 33 to adjust the amount of each of spherical aberration, astigmatism and coma by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 38 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

The first light source 31 emits the first light beam of about 785 nm in wavelength to the first optical disk 3. The second light source 32 emits the second light beam of about 655 nm in wavelength to the second optical disk 4. It should be noted that although the optical pickup 1 is designed so that either the first and second light beams emitted from the first and second light sources disposed in different places is used, the optical pickup 1 may include a light source having a first light emitter to emit a first light beam and a second light emitter to emit a second light beam.

The optical pickup 1 is provided with a light source selector 42 to make a selection between the first and second light sources 31 and 32 correspondingly to the type of an optical disk identified by the disk type discriminator 29. Thus, the light source selector 42 selects either the first or second light source 31 or 32 correspondingly to the disk type identified by the disk type discriminator 29 to emit a light beam.

The objective lens 33 is a two-wavelength objective lens having two focuses. The objective lens 33 is supported on the objective lens driving mechanism such as a biaxial actuator 43 to be movable. The objective lens 33 is moved by the biaxial actuator 43 according to the tracking error signal and focus error signal generated based on the return light reflected from the optical disk 11 and detected by the photodetector 36. It is moved biaxially, that is, toward and away from the optical disk 11 and radially of the optical disk 11.

The objective lens 33 focuses the first or second light beam from the first or second light source 31 or 32 to be always in focus on the signal recording surface of the optical disk 11 while having the focused light beams track a recording track formed on the signal recording surface of the optical disk 11.

At the incident side of the objective lens 33, there is provided an aperture limiting means (not shown) such as an aperture stop and/or hologram screen that provides an aperture limitation for adapting the format of the optical disk 11 to the numerical aperture of the light beam passing by the objective lens 33. The aperture limiting means provides such an aperture limitation that NA=0.45 for reproducing data from the first optical disk 3 and NA=0.5 for recording data to the first optical disk 3, and also such an aperture limitation that NA=0.6 for reproducing data from the second optical disk 4 and NA=0.65 for recording data to the second optical disk 4.

The first beam splitter 34 deflects the optical path of the first light beam emitted from the first light source 31 at about 90 deg. and allows the second light beam emitted from the second light source 32 to pass by and thus join the optical path of the first light beam. More specifically, the first beam splitter 34 deflects, at a splitting surface 34a thereof, the forward traveling path of the first light beam of the first wavelength emitted from the first light source 31 toward the second beam splitter 35. Also, the splitting surface 34a is formed to have, as a membrane, such a wavelength dependence that allows the forward traveling second light beam of the second wavelength to pass by toward the second beam splitter 35.

The second beam splitter 35 reflects the forward traveling first and second light beams whose optical paths have been joined to each other by the first beam splitter 34 at about 90 deg. toward the collimator lens 39, while allowing the returning first and second light beams reflected by the optical disk 11 to pass by toward the cylinder lens 41. The second beam splitter 35 has a splitting surface 35a as a membrane such a characteristic or deflection dependence as to reflect part of the incident light beam while allowing other part of the light beam to pass by.

The collimator lens 39 changes the angle of divergence of the first and second light beams reflected by the second beam splitter to provide a nearly parallel light beam.

Figure 6:
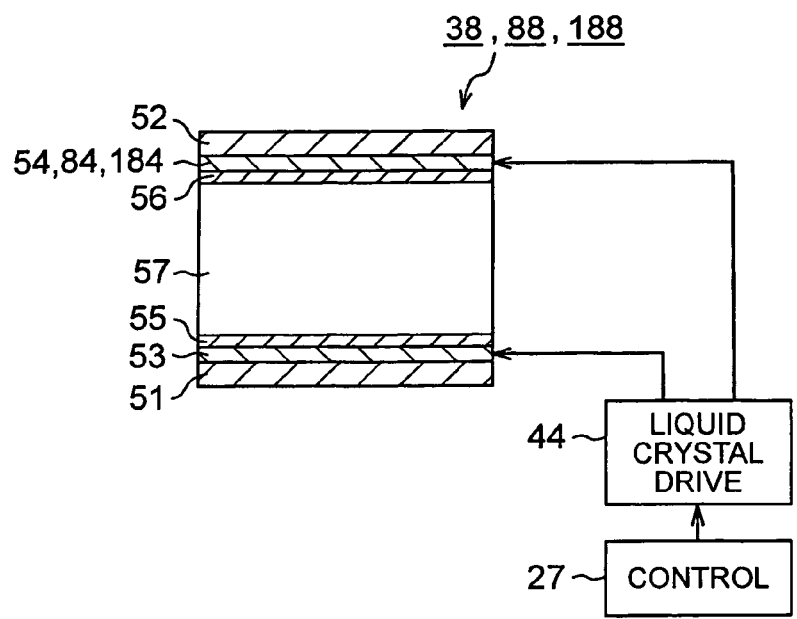
FIG. 6 is a sectional view of a liquid-crystal optical element included in the optical pickup according to the present invention.

The liquid-crystal optical element 38 adjusts the amount of each of spherical aberration, astigmatism and coma by varying its refractive index. As shown in FIG. 6, the liquid-crystal optical element 38 is formed from first and second glass substrates 51 and 52 disposed opposite to each other, first and second electrodes 53 and 54 formed on the opposite surfaces of the first and second substrates 51 and 52 and each having an electrode pattern, and a liquid-crystal molecule layer 57 aligned on contact with alignment layers 55 and 56 between the first and second electrodes 53 and 54.

Figure 7:
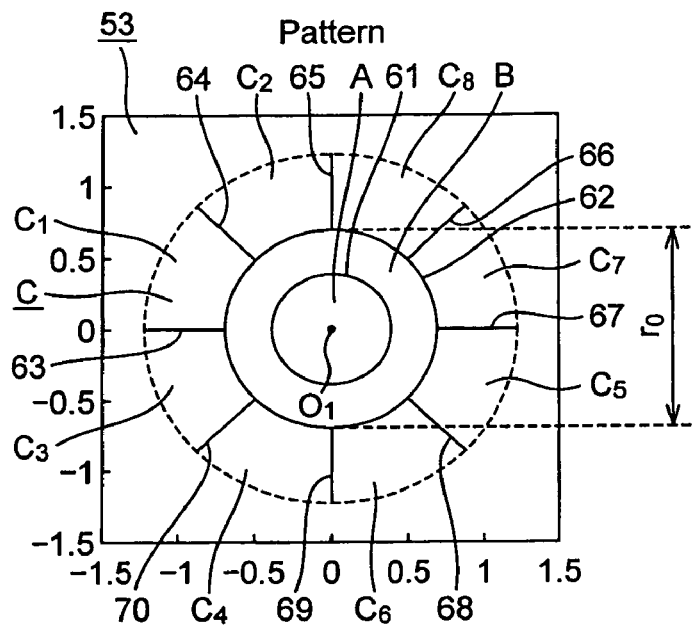
FIG. 7 is a plan view of one of electrode patterns in the liquid-crystal optical element included in the optical pickup according to the present invention.

As shown in FIG. 7, the first electrode 53 provided on one (51) of the glass substrates includes a first electrode pattern that divides the first electrode 53 into a plurality of zones, and a second electrode pattern provided outside the first electrode pattern to divide the first electrode 53 into a plurality of zones.

The above first electrode pattern is to correct spherical aberration. It includes first and second boundaries 61 and 62 generally circular and concentric with each other about an optical axis O1. That is, the first electrode 53 is divided by the first and second boundaries 61 and 62 into zones A, B and C.

The second electrode pattern is to correct astigmatism. It includes third to tenth boundaries 63 to 70 laid outside the second boundary 62 of the first electrode 53, namely, formed like radial straight lines radiating from the optical axis O1 to divide the zone C. The third to tenth boundaries 63 to 70 are disposed with nearly equal angles of adjacent ones correspondingly to astigmatism, that is, with angles of about 45 deg. of the adjacent ones. The zone C of the first electrode 53 is subdivided by the third to tenth boundaries 63 to 70 into eight equal zones C1, C2, C3, C4, C5, C6, C7 and C8.

Figure 8:
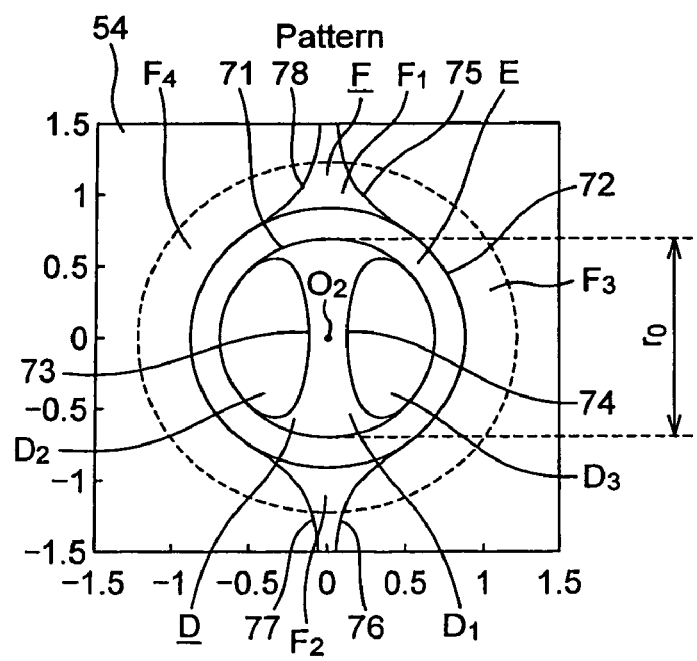
FIG. 8 is a plan view of the other electrode pattern in the liquid-crystal optical element included in the optical pickup according to the present invention.

As shown in FIG. 8, the second electrode 54 provided on the other (52) of the glass substrates has a third electrode pattern that divides the second electrode 54 into a plurality of zones, and a fourth electrode pattern that subdivides the inner and outer zones of the third electrode pattern.

The third electrode pattern is to cooperate with the first electrode pattern to correct spherical aberration. It includes eleventh and twelfth boundaries 71 and 72 generally circular and concentric with each other about an optical axis O2. That is, the second electrode 54 is divided by the eleventh and twelfth boundaries 71 and 72 into zones D, E and F.

The fourth electrode pattern is to correct coma. It includes thirteenth and fourteenth boundaries 73 and 74 that subdivide the zone inside the eleventh boundary 71 of the second electrode 54, that is, the zone D, into three zones, and fifteenth to eighteenth boundaries 75, 76, 77 and 78 that subdivide the zone outside the twelfth boundary 72 on the second electrode 54, that is, the zone F, into four zones.

The thirteenth and fourteenth boundaries 73 and 74 are shaped correspondingly to coma. The zone D of the second electrode 54 is subdivided by the thirteenth and fourteenth boundaries 73 and 74 into zones D1, D2 and D3. The fifteenth to eighteenth boundaries 75, 76, 77 and 78 are shaped correspondingly to coma. The zone F of the second electrode 54 is subdivided by the fifteenth to eighteenth boundaries 75, 76, 77 and 78 into zones F1, F2, F3 and F4.

Note here that the second boundary 62 on the first electrode 53 and eleventh boundary 71 on the second electrode 54 are formed in nearly same positions, respectively, that is, have nearly same radii r0 about the optical axes O1 and O2, respectively.

The liquid-crystal optical element 38 includes a liquid crystal drive 44 to drive and control a potential that is to be applied to each of the first to fourth electrode patterns formed on the first and second electrodes 53 and 54. Receiving a signal from the controller 27, the liquid crystal drive 44 controls the potential applied to each of the zones resulted from division of the first to fourth electrode patterns. Thus, the liquid crystal derive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 38 is controlled by the liquid crystal drive 44 to have the light beam passing by each zone vary in optical path length and generate a phase difference which is to be added to the wavefront of the aberration.

At the first electrode 53, the zones C1 and C5 are supplied with the same drive signal and applied with the same potential by the liquid crystal drive 44. Also, the zones C2 and C6 are supplied with the same drive signal and applied with the same potential by the liquid crystal drive 44. Further, the zones C3 and C7 are supplied with the same drive signal and applied with the same potential by the liquid crystal drive 44. Also, the zones C4 and C8 are supplied with the same signal and applied with the same potential by the liquid crystal drive.

At the first electrode 53, the necessary signals for driving the zones resulted from division by the first and second electrode patterns are in six kinds including signals for driving and controlling the potential applied to each of the zones A and B in addition to the aforementioned four types of signals.

At the second electrode 54, the zones D1, F1 and F2 are supplied with the same drive signal and applied with the same potential by the liquid crystal drive 44. Also, the zones D2 and F3 are supplied with the same drive signal and applied with the same potential by the liquid crystal drive 44. Further, the zones D3 and F4 are supplied with the same drive signal and applied with the same potential by the liquid crystal drive 44.

At the second electrode 54, the necessary signals for driving the zones resulted from division by the third and fourth electrode patterns are in four kinds including a signal for driving and controlling the potential applied to the zone E in addition to the aforementioned three kinds of signals.

When correcting spherical aberration, the potential applied to the zone B of the first electrode 53 and zone E of the second electrode 54 is controlled by the controller 27 and liquid crystal drive 44 and thus the liquid-crystal optical element 38 corrects the spherical aberration by adding a phase difference to the wavefront of the spherical aberration.

Also, when correcting astigmatism, the potential applied to the zones C1 and C5, zones C2 and C6, zones C3 and C7 and zones C4 and C8 of the first electrode 53 is controlled by the controller 27 and liquid crystal drive 44 and thus the liquid-crystal optical element 38 corrects the astigmatism by adding a phase difference to the wavefront of the astigmatism.

Further, when correcting coma, the potential applied to the zones D2 and F3 and zones D3 and F4 of the second electrode 54 is controlled by the controller 27 and liquid crystal drive 44 and thus the liquid-crystal optical element 38 corrects the coma by adding a phase difference to the wavefront of the coma.

In the optical pickup 1 according to the present invention, spherical aberration, astigmatism and coma can well be corrected by the liquid-crystal optical element 38 having the first and third electrode patterns to correct spherical aberration, second electrode pattern to correct astigmatism and fourth electrode pattern to correct coma and that controls each of the zones resulted from division by these electrode patterns independently. Therefore, the electrode patterns in the liquid-crystal optical element can be simplified, the liquid-crystal optical element can thus be controlled more easily and spherical aberration, astigmatism and coma can be corrected optimally. The optical pickup 1 according to the present invention can thus record and reproduce data to and from a recording medium with an improved performance.

In the liquid-crystal optical element 38, the first and second boundaries 61 and 62 on the first electrode pattern and the eleventh and twelfth boundaries 71 and 72 on the third electrode pattern are positioned as will be described below. That is, positions where the electrode patterns for correction of spherical aberration are to be divided as will be explained below.

Generally, it is well known that spherical aberration can be represented by a phase distribution=SA×(6r4+6r2+1)[λ] taking the distance r from the center of a light beam as the horizontal axis and the phase distribution of the waveform as the vertical axis. Normalizing the spherical aberration so that the maximum amount of phase difference is 1 (one) and an effective radius on which a position from the center (optical axes O1 and O2) of a light beam depends upon a numerical aperture is 1 (one) results in a phase distribution as indicated with a solid line $L_{21}$ shown in FIG. 9.

Figure 9:
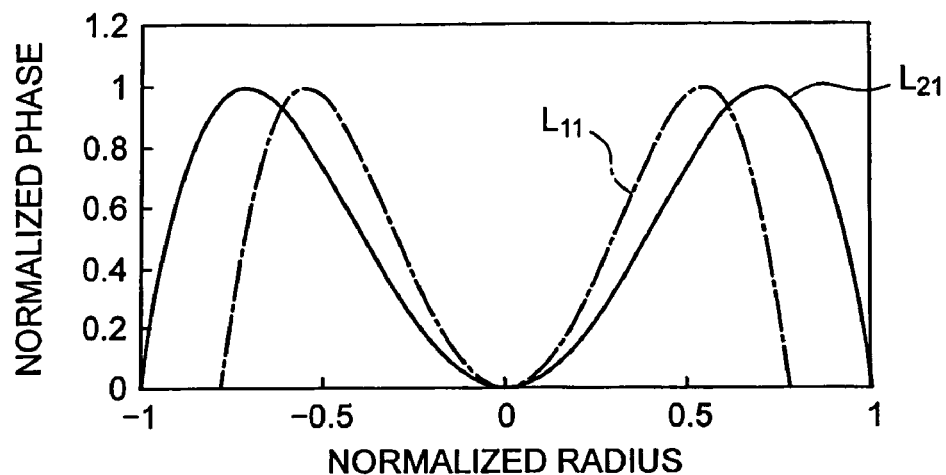
FIG. 9 shows a normalized phase distribution of the wavefront of a spherical aberration occurring when recording and reproducing information signal to or from each of first and second optical disks different in format from each other.
Figure 10:
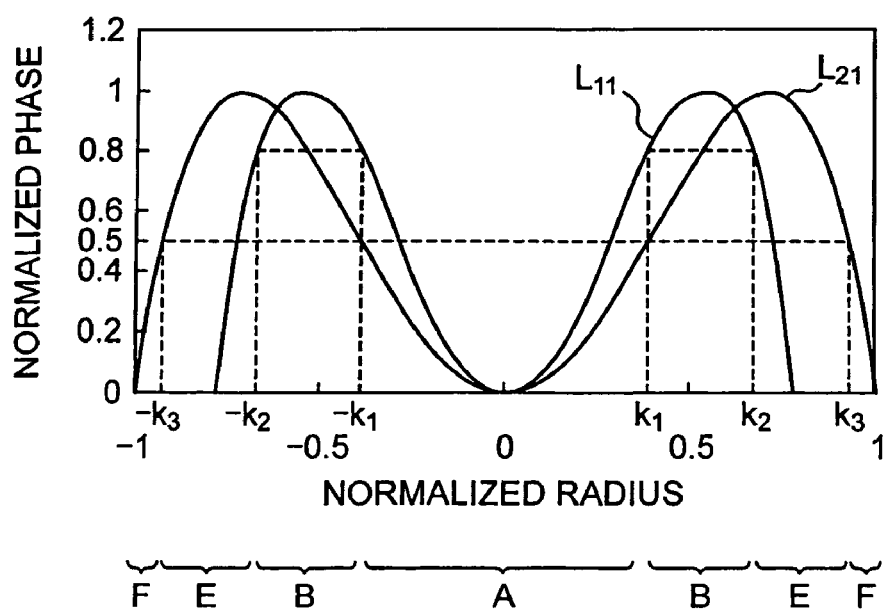
FIG. 10 shows the relation, in the optical pickup according to the present invention, among phase difference amounts of spherical aberrations occurring in first and second light beams, first and second amounts of phase difference for correction of the spherical aberrations by the liquid-crystal optical element, and normalized radii of boundaries of a spherical aberration-correcting electrode pattern.

Since one of the amounts of the spherical aberration of the first and second optical disks 3 and 4 of different types is corrected by the single liquid-crystal optical element 38, the spherical aberration of the first and second optical disks 3 and 4 is normalized herein so that the effective radius of the second optical disk 4 whose numerical aperture is large is 1 (one). That is, the solid line $L_{21}$ shown in FIG. 9 represents a phase distribution of the wavefront of the spherical aberration of the second optical disk 4 whose numerical aperture is large. The vertical axis indicates such normalization that the maximum amount of phase difference of the spherical aberration of the second optical disk 4 is 1 (one). Also, normalizing the phase distribution of the wavefront of the spherical aberration of the first optical disk 3 so that the maximum amount of phase difference of the spherical aberration of the first optical disk 3 is 1 (one) and the effective radius on which a position from the center of the light beam depends upon the numerical aperture of the second optical disk 4 is 1 (one) results in a phase distribution as indicated with a dashed line $L_{11}$ in FIG. 9.

That is, the solid line $L_{21}$ shown in FIG. 9 represents a phase distribution of the wavefront of the spherical aberration of the second optical disk 4 whose numerical aperture is large. The vertical axis indicates such normalization that the maximum amount of phase difference of the spherical aberration of the second optical disk 4 is 1 (one). The dashed line $L_{11}$ in FIG. 9 indicates such a normalization that the maximum amount of phase difference of the spherical aberration of the first optical disk 3 is 1 (one) and the effective radius on which a position from the center of the light beam depends upon the numerical aperture of the second optical disk 4 is 1 (one).

The first and twelfth boundaries 61 and 72 are formed in positions where the phase difference of the spherical aberration of the second optical disk 4 is equal to a second phase difference Pc2 for correction of spherical aberration. The second spherical aberration-correcting phase difference amount Pc2 is determined as given by the following expressions (1) and (2):

$$Pc2 = y2 \cdot Pm2 \quad (1)$$

$$0.35 \leq y2 \leq 0.5 \quad (2)$$

where y2 is a ratio of the second spherical aberration-correcting phase difference amount Pc2 to the maximum phase difference amount Pm2 of the spherical aberration of second optical disk 4 (the phase difference amount for addition by the liquid-crystal optical element 38 to the wavefront of the spherical aberration, that is, an amount of correction, is determined by varying this ratio), and y2=0.5.

More specifically, positions in which the second spherical aberration-correcting phase difference amount Pc2 is equal to the phase distribution, that is, normalized radii k1 (−k1) and k3 (−k3) at which the phase distribution of the spherical aberration of the second optical disk 4 is 0.5 (a normalized second spherical aberration-correcting phase difference amount), are resulted from normalization of the radii of the first boundary 61 and twelfth boundary 72, as shown in FIG. 7. Further, the radius of the first boundary 61 will be r1·k1 where r1 is the effective radius of the second light beam on the first electrode 53 for the second optical disk 4 and r2 is the effective radius of the second light beam on the second electrode 54. Similarly, the radius r2 of the twelfth boundary 72 will be r2·k3. Similarly, the second light beam on the second electrode 54 is nearly equal to the effective radius r1 of the second light beam on the first electrode 53.

The second boundary 62 is formed in a position where the phase difference of the spherical aberration of the first optical disk 3 is equal to the first spherical aberration-correcting phase difference amount Pc1. Also the first spherical aberration-correcting phase difference amount Pc1 is equal to the phase difference of the spherical aberration of the first optical disk 3 in the position where the first boundary 61 is provided. It should be noted here that the first spherical aberration-correcting phase difference amount Pc1 is y1=0.8 when it is represented by the following expressions (3) and (4).

$$Pc1 = y1 \cdot Pm1 \quad (3)$$

$$0.5 \leq y1 \leq 0.8 \quad (4)$$

where y1 is a ratio of the first spherical aberration-correcting phase difference Pc1 to the maximum phase-difference amount Pm1 of the spherical aberration of first optical disk 3 (the phase difference amount for addition by the liquid-crystal optical element 38 to the wavefront of the spherical aberration, that is, an amount of correction, is determined by varying this ratio).

More particularly, the first spherical aberration-correcting phase difference amount Pc1 is made equal to the phase difference of the spherical aberration of the first optical disk 3 in the position where the first boundary 61 is provided. That is, the phase difference of the spherical aberration in the position where the normalized radius is k1 (−k1) is taken as the first spherical aberration-correcting phase difference amount Pc1, and the normalized value is about 0.8.

Also, positions in which the first spherical aberration-correcting phase difference amount Pc1 is equal to the phase distribution, that is, normalized radius k2 (−k2) at which the phase distribution of the spherical aberration of the first optical disk 3 is 0.8 (a normalized first spherical aberration-correcting phase difference amount Pc1), is resulted from normalization of the radius of the second boundary 62. Further, the radius of the second boundary 62 will be r1·k2 where r1 is the effective radius of the second light beam on the first electrode 53 for the first optical disk 3. It should be noted that the radius of the eleventh boundary 71 on the second electrode 54 is nearly equal to the effective radius r1·k2 of the second boundary 62.

Figure 11B:
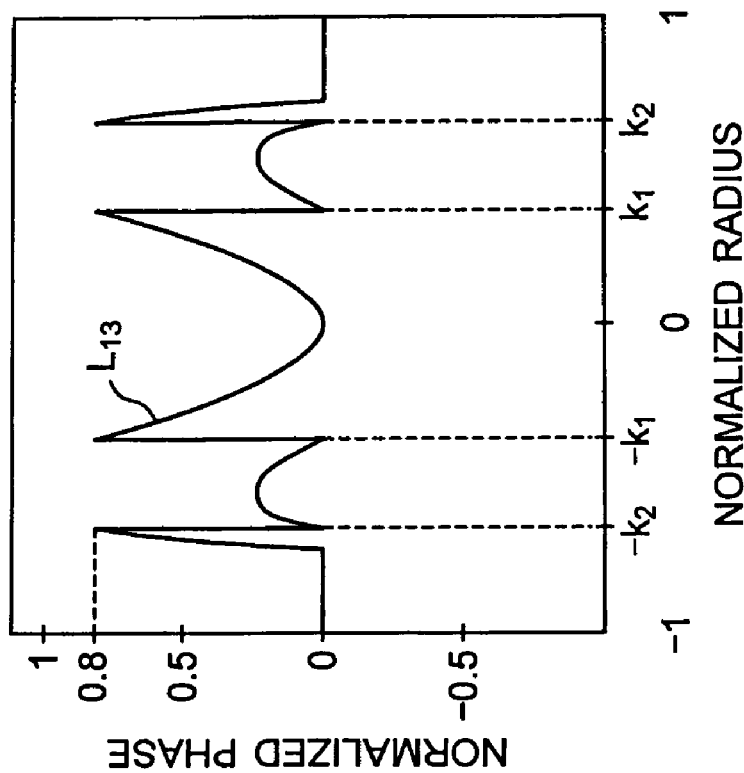
FIG. 11B shows a phase difference amount when the first spherical aberration-correcting phase difference amount is added to the spherical aberration occurring in the first light beam.
Figure 11A:
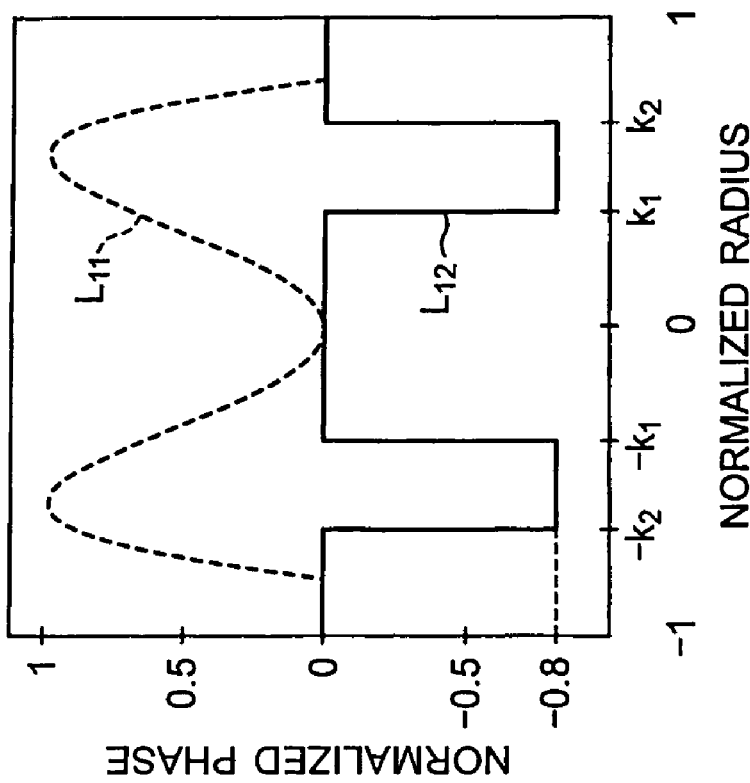
FIG. 11A shows a phase distribution of spherical aberrations occurring in the first light beam and a first spherical aberration-correcting phase difference amount added by the liquid-crystal optical element to the first optical beam, in the optical pickup according to the present invention.

In the liquid-crystal optical element 38, when an optical disk is identified as the first optical disk 3 by the disk discriminator 29, the potential applied to a zone between the first and second boundaries 61 and 62 on the first electrode 53, that is, the zone B, is changed so that the potential difference, namely, voltage, between the zone B of the first electrode 53 and a zone opposite to the zone B of the second electrode 54 is changed. Thus, the liquid crystal molecules in the layer 57 are changed in alignment so that the refractive index will be changed. When the refractive index of the liquid crystal molecule layer 57 between the zones B of the first electrode 53 and a zone opposite to the zone B of the second electrode 54 is changed, the first spherical aberration-correcting phase difference amount Pc1 indicated with a solid line $L_{12}$ in FIG. 11A is added to the first light beam passing by the zone B and thus the phase difference amount, that is, the amount of the spherical aberration, is reduced as shown in FIG. 11B. In other words, when the first spherical aberration-correcting phase difference amount indicated with the solid line $L_{12}$ is added to the phase distribution of the spherical aberration indicated with the dashed like $L_{11}$ in FIG. 11A, a light beam having a phase distribution indicated with a solid line $L_{13}$ in FIG. 11B will result and the aberration will be reduced. It should be noted that the variation of the voltage to be changed is determined by the controller 27 supplied with a signal from the photodetector 36 and the liquid crystal drive 44 will apply the zone B with a predetermined potential that will vary in voltage by the predetermined variation.

Also, in the liquid-crystal optical element 38, when an optical disk is identified as the second optical disk 4 by the disk discriminator 29, the potential applied to a zone between the first and second boundaries 61 and 62 on the first electrode 53, that is, the zone B and a zone between the eleventh and twelfth boundaries 71 and 72 on the second electrode 54, that is, the zone E, is changed so that the potential difference, namely, voltage, between the zone B of the first electrode 53 and a zone opposite to the zone E and between the zone E of the second electrode 54 and a zone opposite to the zone B is changed. Thus, the liquid crystal molecule in the layer 57 is changed in alignment so that the refractive index will be changed. When the refractive index of the liquid crystal molecule layer 57 between the zone B of the first electrode 53 and a zone opposite to the zone E and between the zone E on the second electrode 54 and a zone opposite to the zone B is changed, the second spherical aberration-correcting phase difference amount Pc2 indicated with a solid line $L_{22}$ in FIG. 12A is added to the second light beam passing by the zones B and E and thus the phase difference amount, that is, the amount of the spherical aberration, is reduced as shown in FIG. 12B. In other words, when the second spherical aberration-correcting phase difference amount Pc2 indicated with the solid line $L_{22}$ is added to the phase distribution of the spherical aberration indicated with the dashed like $L_{21}$ in FIG. 12A, a light beam having a phase distribution indicated with a solid line $L_{23}$ in FIG. 12B will result and the aberration will thus be reduced. It should be noted that the variation of the voltage to be changed is determined by the controller 27 supplied with a signal from the photodetector 36 and the liquid crystal drive 44 will apply the zones B and E with a predetermined potential that will vary in voltage by the predetermined variation.

Figure 13:
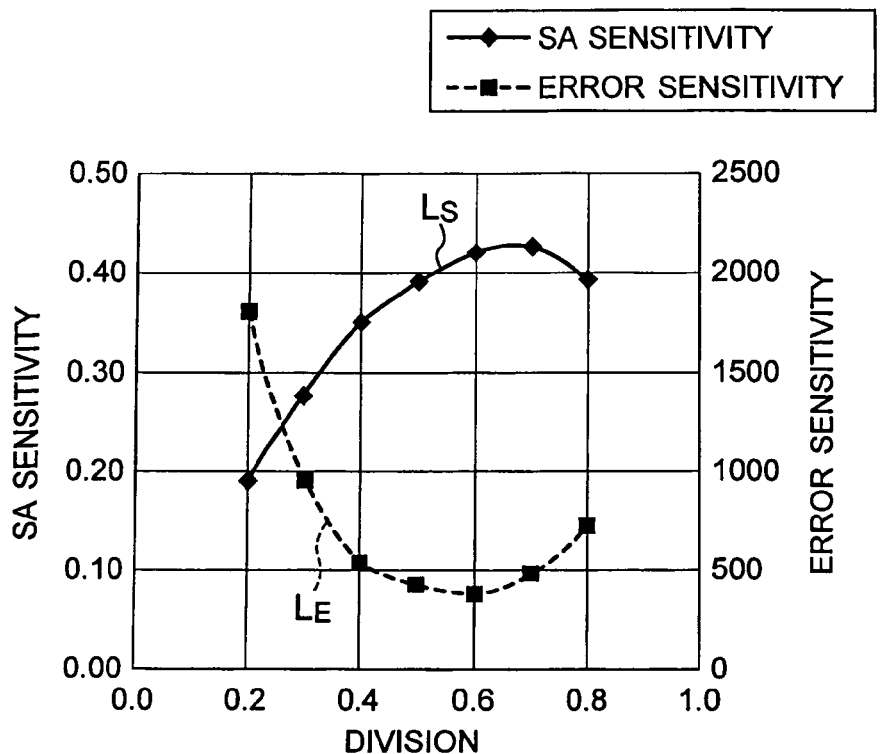
FIG. 13 shows the relation between the first and second spherical aberration-correcting phase difference amounts in the liquid-crystal optical element and SA sensitivity or error sensitivity in the optical pickup according to the present invention.

FIG. 13 shows the results of simulation of the SA sensitivity and error sensitivity when y1 and y2 upon which the first and second correcting phase difference amounts depend are changed. In FIG. 13, a solid line LS indicates the change of SA sensitivity when y1 in the expressions (1) to (4) is changed and dashed line LE indicates the change of error sensitivity. It should be noted here that the SA sensitivity indicates an amount of spherical aberration correction when a constant voltage is applied between the first and second electrodes 53 and 54. Also, the error sensitivity indicates an aberration other than the spherical aberration when the constant spherical aberration has been corrected. As shown in FIG. 13, both the SA sensitivity and error sensitivity can be optimized when y1 is within a range of $0.35 \leq y1 \leq 0.8$. Also, both the SA sensitivity and error sensitivity can be optimized when y2 is within a range of $0.35 \leq y2 \leq 0.8$. However, since y1 and y2 in the liquid-crystal optical element 38 are in conjunction with each other, both y1 and y2 should be within the range of 0.35 to 0.8. Therefore, when y1 and y2 are within the ranges of $0.5 \leq y1 \leq 0.8$ and $0.35 \leq y2 \leq 0.5$, respectively, both the SA sensitivity and error sensitivity can be optimized.

As above, the liquid-crystal optical element 38 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone B of the first electrode 53 is changed. Also, when the second optical disk 4 is loaded, the potential applied to the combination of the zone B of the first electrode 53 and zone E of the second electrode 54 in is changed. By controlling the voltage applied to the first and third electrode patterns, that is, the voltage applied to the zones resulted from division by these electrode patterns, the liquid-crystal optical element 38 can optimally adjust the spherical aberration with a simple control correspondingly to the type of an optical disk.

In the optical pickup 1 according to the present invention, since a combination of those of the zones resulted from division by the first and third spherical aberration-correcting electrode patterns in the liquid-crystal optical element 38, which are driven under the same condition, is selected correspondingly to the type of an optical disk in consideration, spherical aberration can be corrected suitably for the first and second optical disks different in format from each other.

Next, there will be illustrated and described the optical paths of light beams emitted from the first and second light sources 31 and 32 in the optical pickup 1 constructed as above.

First, the forward light path of the first light beam emitted from the first light source 31 will be described. As shown in FIG. 5, the first light beam emitted from the first light source 31 is reflected at the splitting surface 34a of the first beam splitter 34 to have the optical path thereof deflected at about 90 deg. The first light beam reflected by the first beam splitter 34 is reflected at the splitting surface 35a of the second beam splitter 35 to have the optical path thereof reflected at about 90 deg., it is changed in angle of divergence by the collimator lens 39 to be a nearly parallel beam, and the reflected by the mirror 37 to have the optical path thereof bent at about 90 deg. for incidence upon the liquid-crystal optical element 38.

The first light beam incident upon the liquid-crystal optical element 38 is subjected to correction of spherical aberration, astigmatism and coma, and then projected to the objective lens 33. At this time, in the liquid-crystal optical element 38, the potential applied to the zone B of the first electrode 53 corresponding to the first optical disk 3 is controlled by the controller 27 and liquid crystal drive 44 correspondingly to the type of the optical disk identified by the disk type discriminator 29, and an appropriate first spherical aberration-correcting phase difference amount Pc1 is added to the incident first light beam to correct the spherical aberration. Also, the liquid-crystal optical element 38 is supplied with a detection signal from the photodetector 36, and a potential applied to each zone for correction of each of the spherical aberration, astigmatism and coma is determined and controlled by the controller 27 and liquid crystal drive 44.

The first light beam having the spherical aberration thereof corrected by the liquid-crystal optical element 38 is incident upon the objective lens 33 and limited in aperture to the numerical aperture corresponding to the first optical disk 3, and then focused by the objective lens 33 onto the signal recording surface of the first optical disk 3.

Next, there will be explained the forward optical path of the second light beam emitted from the second light source 32. As shown in FIG. 5, the second light beam emitted from the second light source 32 is allowed by the splitting surface 34a of the first beam splitter 34 to pass by and is incident upon the second beam splitter 35. The optical path of the second light beam incident upon the second beam splitter 35 is reflected, like the first light beam, by the second beam splitter 35, shaped by the collimator lens 39 to be a nearly parallel beam, and reflected by the mirror 37 for incidence upon the liquid-crystal optical element 38.

The second light beam incident upon the liquid-crystal optical element 38 is subjected to correction of spherical aberration, astigmatism and coma, and then projected to the objective lens 33. At this time, in the liquid-crystal optical element 38, the potential applied to the zone B of the first electrode 53 and zone E of the second electrode 54, corresponding to the second optical disk 4, is controlled by the controller 27 and liquid crystal drive 44 correspondingly to the type of the optical disk identified by the disk type discriminator 29, and an appropriate second spherical aberration-correcting phase difference amount Pc2 is added to the incident second light beam to correct the spherical aberration. Also, the liquid-crystal optical element 38 is supplied with a detection signal from the photodetector 36, and a potential applied to each zone for correction of each of the spherical aberration, astigmatism and coma is determined and controlled by the controller 27 and liquid crystal drive 44.

The second light beam having the spherical aberration thereof corrected by the liquid-crystal optical element 38 is incident upon the objective lens 33 and limited in aperture to the numerical aperture corresponding to the second optical disk 4, and then focused by the objective lens 33 onto the signal recording surface of the second optical disk 4.

Next, there will be described the backward optical path of the first and second light beams reflected at the signal record-ing surface of the first or second optical disk 3 or 4. As shown in FIG. 5, the first or second light beam focused on the first or second optical disk 3 or 4 is reflected by the first or second optical disk 3 or 4, passes by the objective lens 33, liquid-crystal optical element 38, mirror 37 and collimator lens 39, and then is incident back upon the second beam splitter 35. The first or second light beam incident upon the second beam splitter 35 is allowed to pass by the splitting surface 35a, has the angle of divergence thereof changed by the cylinder lens 41, and thus focused on the photodetector 36.

In the optical pickup 1 according to the present invention, spherical aberration, astigmatism and coma can optimally be corrected by the single liquid-crystal optical element 38 without complicated electrode patterns in the liquid-crystal optical element 38 and also without complicated control of the liquid crystal drive 44 that drives the liquid-crystal optical element 38. That is, in the optical pickup 181 according to the present invention, the spherical aberration, astigmatism and coma can independently be controlled and corrected well by controlling each of the zones resulted from division by the electrode patterns. Thus, the electrode patterns in the liquid-crystal optical element can be simplified, the liquid-crystal optical element can be driven under a simpler control, and the spherical aberration, astigmatism and coma can optimally be corrected by the single liquid-crystal optical element to thereby record and/or reproduce data to and/or from the optical disk with an improved performance.

Also, in the optical pickup 1 according to the present invention, spherical aberration can be corrected optimally for the first and second optical disks 3 and 4 different in format from each other. That is, the optical pickup 1 according to the present invention can record and/or reproduce data to and/or from such optical disks having the different formats with the improved performance and can have the optical elements and circuits thereof constructed more simply.

Further, the optical pickup 1 according to the present invention can be designed more compact through simplification of its construction.

Note that although the aforementioned optical pickup 1 uses the liquid-crystal optical element 38 in which the second electrode 54 is divided by the eleventh boundary 71 to eighteenth boundary 78 as shown in FIG. 8 into the plurality of zones, the present invention is not limited to this arrangement but the liquid-crystal optical element may be designed to have an electrode pattern that works with the first electrode pattern on the first electrode 53 to correct spherical aberration and an electrode pattern that corrects coma.

Next, an optical pickup 81 using another example of the second electrode having formed thereon an electrode pattern to correct spherical aberration and an electrode pattern to correct coma will be described with reference to FIG. 5. It should be noted that the same elements in this optical pickup 81 as those in the optical pickup 1 will be indicated with the same reference numerals as those used in the illustration and description of the optical pickup 1 and will not be described in detail.

As shown in FIG. 5, the optical pickup 81 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and join the optical path of the first light beam to that of the second light beam emitted from the second light source 32, a second beam splitter 35 as an optical path splitting means to change and guide the optical paths of the first and second light beams, joined together by the first beam splitter 34, to the objective lens 33, and split the optical path of the return light from the optical disk from the that of the first or second light beam emitted from the first or second light source 31 or 32 and traveling forward, and a photodetector 36 to detect the return light split by the second beam splitter 35 from the forward traveling light beam.

Also, the optical pickup 81 includes a mirror 37 as an upward reflecting means provided between the objective lens 33 and second beam splitter 35 to reflect the first and second light beams at about 90 deg. toward the objective lens 33, a liquid-crystal optical element 88 provided between the mirror 37 and objective lens 33 to adjust the amount of each of spherical aberration by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 88 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

The liquid-crystal optical element 88 is provided to adjust the amount of aberrations such as spherical aberration, astigmatism, coma and the like by varying the refractive index thereof. As shown in FIG. 6, the liquid-crystal optical element 88 is formed from first and second glass substrates 51 and 52 disposed opposite to each other, first and second electrodes 53 and 84 formed on the opposite surfaces of the first and second glass substrates 51 and 52 and having their respective electrode patterns, and a layer 57 of liquid crystal molecules disposed between the first and second electrodes 53 and 84 and aligned with alignment layers 55 and 56 laid inside the first and second electrode 53 and 84. The first electrode 53 provided on one (51) of the glass substrates is similar to the first electrode in the aforementioned liquid-crystal optical element 38, and so will not be described in detail.

Figure 14:
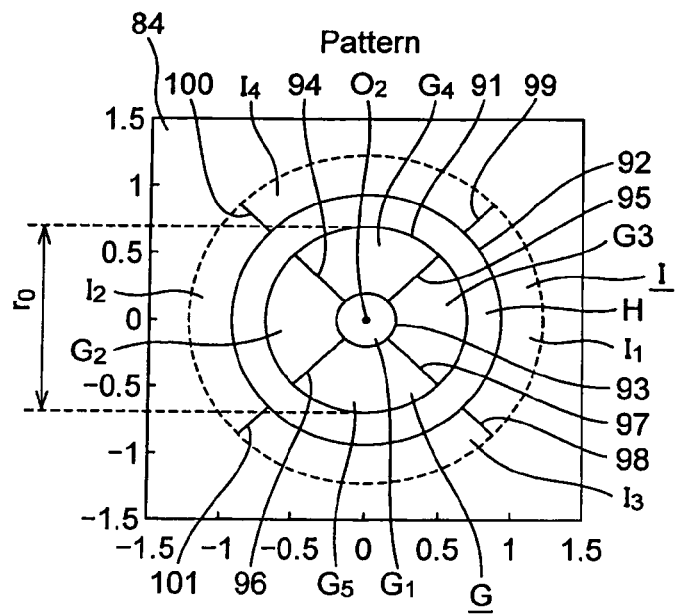
FIG. 14 is a sectional view of another example of the other electrode pattern in the liquid-crystal optional element included in the optical pickup according to the present invention.

The second electrode 84 provided on the other glass substrate 52 has a fifth electrode pattern that divides the second electrode 84 into a plurality of zones, and a sixth electrode pattern that subdivides the inner and outer zones of the fifth electrode pattern as shown in FIG. 14.

The fifth electrode pattern is to work along with the above first electrode pattern to correct spherical aberration, and it includes nineteenth and twentieth boundaries 91 and 92 that are nearly circular and concentric with each other about the optical axis O2. That is, the second electrode 84 is divided by the nineteenth and twentieth boundaries 91 and 92 into zones G, H and I.

The sixth electrode pattern is to correct coma. It includes twenty-first to twenty-fifth boundaries 93, 94, 95, 96 and 97 that subdivide the zone inside the nineteenth boundary 91 of the second electrode 84, that is, a zone G, into five equal zones, and twenty-sixth to twenty-ninth boundaries 98, 99, 100 and 101 that subdivide the zone outside the twentieth boundary 92 of the second electrode 84, that is, a zone I, into four equal zones.

The twenty-first boundary 93 is formed inside the nineteenth boundary 91 and concentrically with the nineteenth boundary 91. The twenty-second to twenty-fifth boundaries 94, 95, 96 and 97 are formed linear radially from the optical axis O2 and the angles formed between two adjacent ones of them are nearly equal to each other. For correction of coma, the angle formed between two adjacent ones of the twenty-second to twenty-fifth boundaries 94, 95, 96 and 97 is about 90 deg. The zone G of the second electrode 84 is subdivided by the twenty-first to twenty-fifth boundaries 93, 94, 95, 96 and 97 into zones G1, G2, G3, G4 and G5.

The twenty-sixth to twenty-ninth boundaries 98, 99, 100 and 101 are formed linear radially from the optical axis O2 and the angles formed between two adjacent ones of them are nearly equal to each other. For correction of coma, the angle formed between two adjacent ones of the twenty-sixth to twenty-ninth boundaries 98, 99, 100 and 101 is about 90 deg. Also, the twenty-sixth to twenty-ninth boundaries 98, 99, 100 and 101 are formed nearly in alignment with extensions of the twenty-second to twenty-fifth boundaries 94, 95, 96 and 97, respectively. The zone I of the second electrode 84 is subdivided by the twenty-sixth to twenty-ninth boundaries 98, 99, 100 and 101 into zones I1, I2, I3 and I4.

Note here that the second boundary 62 on the first electrode 53 and nineteenth boundary 91 on the second electrode 84 are formed in nearly same positions, respectively, that is, have nearly same radii r0 about the optical axes O1 and O2, respectively.

The liquid-crystal optical element 88 includes a liquid crystal drive 44 to drive and control a potential that is to be applied to each of the first, second, fifth and sixth electrode patterns formed on the first and second electrodes 53 and 84. Receiving a signal from the controller 27, the liquid crystal drive 44 controls the potential applied to each of the zones resulted from division of the first, second, fifth and sixth electrode patterns. Thus, the liquid crystal derive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 88 is controlled by the liquid crystal drive 44 to have the light beam passing by each zone vary in optical path length and generate a phase difference which is to be added to the wavefront of the aberration.

At the first electrode 53, the zones C1 and C5 are supplied with the same drive signal and applied with the same potential by the liquid crystal drive 44. Also, the zones C2 and C6 are supplied with the same drive signal and applied with the same potential by the liquid crystal drive 44. Further, the zones C3 and C7 are supplied with the same drive signal and applied with the same potential by the liquid crystal drive 44. Also, the zones C4 and C8 are supplied with the same signal and applied with the same potential by the liquid crystal drive.

At the first electrode 53, the necessary signals for driving the zones resulted from division by the first and second electrode patterns are in six kinds including signals for driving and controlling the potential applied to each of the zones A and B in addition to the aforementioned four kinds of signals.

At the second electrode 84, the zones G2 and I1 are supplied with the same drive signal and applied with the same potential by the liquid crystal drive 44. Also, the zones G3 and I2 are supplied with the same drive signal and applied with the same potential by the liquid crystal drive 44. Further, the zones G4 and I3 are supplied with the same drive signal and applied with the same potential by the liquid crystal drive 44.

Further, the zones G5 and I4 are supplied with the same drive signal and applied with the same potential by the liquid crystal drive 44.

At the second electrode 84, the necessary signals for driving the zones resulted from division by the fifth and sixth electrode patterns are in six kinds including signals for driving and controlling the potential applied to each of the zones G1 and H in addition to the aforementioned four kinds of signals.

When correcting spherical aberration, the potential applied to the zone B of the first electrode 53 and zone H of the second electrode 84 is controlled by the controller 27 and liquid crystal drive 44 and thus the liquid-crystal optical element 88 corrects the spherical aberration by adding a phase difference to the wavefront of the spherical aberration.

Also, when correcting astigmatism, the potential applied to the zones C1 and C5, zones C2 and C6, zones C3 and C7 and zones C4 and C8 of the first electrode 53 is controlled by the controller 27 and liquid crystal drive 44 and thus the liquid-crystal optical element 88 corrects the astigmatism by adding a phase difference to the wavefront of the astigmatism.

Further, when correcting coma, the potential applied to the zones G2 and I1, zones G3 and I2, zones G4 and I3 and zones G5 and I4 of the second electrode 84 is controlled by the controller 27 and liquid crystal drive 44 and thus the liquid-crystal optical element 88 corrects the coma by adding a phase difference to the wavefront of the coma.

In the optical pickup 81 according to the present invention, spherical aberration, astigmatism and coma can well be corrected by the liquid-crystal optical element 88 having the first and fifth electrode patterns to correct spherical aberration, second electrode pattern to correct astigmatism and sixth electrode pattern to correct coma and that controls each of the zones resulted from division by these electrode patterns independently. Therefore, the electrode patterns in the liquid-crystal optical element can be simplified, the liquid-crystal optical element can thus be controlled more simply, and spherical aberration, astigmatism and coma can be corrected optimally by the single liquid-crystal optical element. The optical pickup 81 according to the present invention can thus record and reproduce data to and from a recording medium with an improved performance.

Note that since at the liquid-crystal optical element 88, the first and second boundaries 61 and 62 on the first electrode pattern and the nineteenth and twentieth boundaries 91 and 92 on the fifth electrode pattern, that is, positions where the spherical aberration-correcting pattern is to be divided, are located similarly to the first and second boundaries 61 and 62 on the first electrode pattern and the eleventh and twelfth boundaries 71 and 72 on the third electrode pattern at the liquid-crystal optical element 38, they will not be described in detail.

As above, the liquid-crystal optical element 88 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone B of the first electrode 53 is changed. Also, when the second optical disk 4 is loaded, the potential applied to the combination of the zone B of the first electrode 53 and zone H of the second electrode 84 is changed. By controlling the voltage applied to the first and fifth electrode patterns, that is, the voltage applied to the zones resulted from division by these electrode patterns, the liquid-crystal optical element 88 can optimally adjust the spherical aberration with a simple control correspondingly to the type of an optical disk.

In the optical pickup 81 according to the present invention, since a combination of those of the zones resulted from division by the first and fifth spherical aberration-correcting electrode patterns in the liquid-crystal optical element 88, which are driven under the same condition, is selected correspondingly to the type of an optical disk in consideration, spherical aberration can be corrected suitably for the first and second optical disks different in format from each other.

In the optical pickup 81 constructed as above, the optical paths of light beams emitted from the first and second light sources 31 and 32 pass by the liquid-crystal optical element 88 (38 in the optical pickup 1) and are subjected to correction of spherical aberration, astigmatism and coma as in the optical pickup 1. So, the optical paths will not be described in detail.

In the optical pickup 81 according to the present invention, spherical aberration, astigmatism and coma can optimally be corrected by the single liquid-crystal optical element 88 without complicated electrode patterns in the liquid-crystal optical element 88 and also without complicated control of the liquid crystal drive 44 that drives the liquid-crystal optical element 88. That is, in the optical pickup 81 according to the present invention, the spherical aberration, astigmatism and coma can be controlled independently and well corrected by controlling each of the zones resulted from division by the electrode patterns. Thus, the electrode patterns in the liquid-crystal optical element can be simplified to drive and control the liquid-crystal optical element more simply, and the spherical aberration, astigmatism and coma can optimally be corrected by the single liquid-crystal optical element to thereby record and/or reproduce data to and/or from the optical disk with an improved performance.

Also, in the optical pickup 81 according to the present invention, spherical aberration can be corrected optimally for the first and second optical disks 3 and 4 different in format from each other. That is, the optical pickup 81 according to the present invention can record and/or reproduce data to and/or from such optical disks having the different formats with the improved performance and can have the optical elements and circuits thereof constructed more simply.

Further, the optical pickup 81 according to the present invention can be designed more compact through simplification of its construction.

Note that although in the aforementioned optical pickup 1 (81), the liquid-crystal optical element 38 (88) has the first electrode 53 thereof divided by the first to tenth boundaries 61 to 70 as shown in FIG. 7 into the plurality of zones, the present invention is not limited to this arrangement but the liquid-crystal optical element may be designed to have an electrode pattern that works with the third electrode pattern on the second electrode 54 to correct spherical aberration and an electrode pattern that corrects astigmatism.

Next, an optical pickup 111 using another example of the first electrode having formed thereon an electrode pattern to correct spherical aberration and an electrode pattern to correct coma will be described with reference to FIG. 5. It should be noted that the same elements in this optical pickup 111 as those in the optical pickups 1 and 81 will be indicated with the same reference numerals as those used in the illustration and description of the optical pickups 1 and 81 and will not be described in detail.

As shown in FIG. 5, the optical pickup 111 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and combine the optical path of the first light beam with that of the second light beam emitted from the second light source 32, a second beam splitter 35 as an optical path splitting means to change and guide the optical paths of the first and second light beams, joined together by the first beam splitter 34, to the objective lens 33, and split the optical path of the return light from the optical disk from the that of the first or second light beam emitted from the first or second light source 31 or 32 and traveling forward, and a photodetector 36 to detect the return light split by the second beam splitter 35 from the forward traveling light beam.

Also, the optical pickup 111 includes a mirror 37 as an upward reflecting means provided between the objective lens 33 and second beam splitter 35 to reflect the first and second light beams at about 90 deg. toward the objective lens 33, a liquid-crystal optical element 118 provided between the mirror 37 and objective lens 33 to adjust the amount of each of spherical aberration by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 118 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

Figure 15:
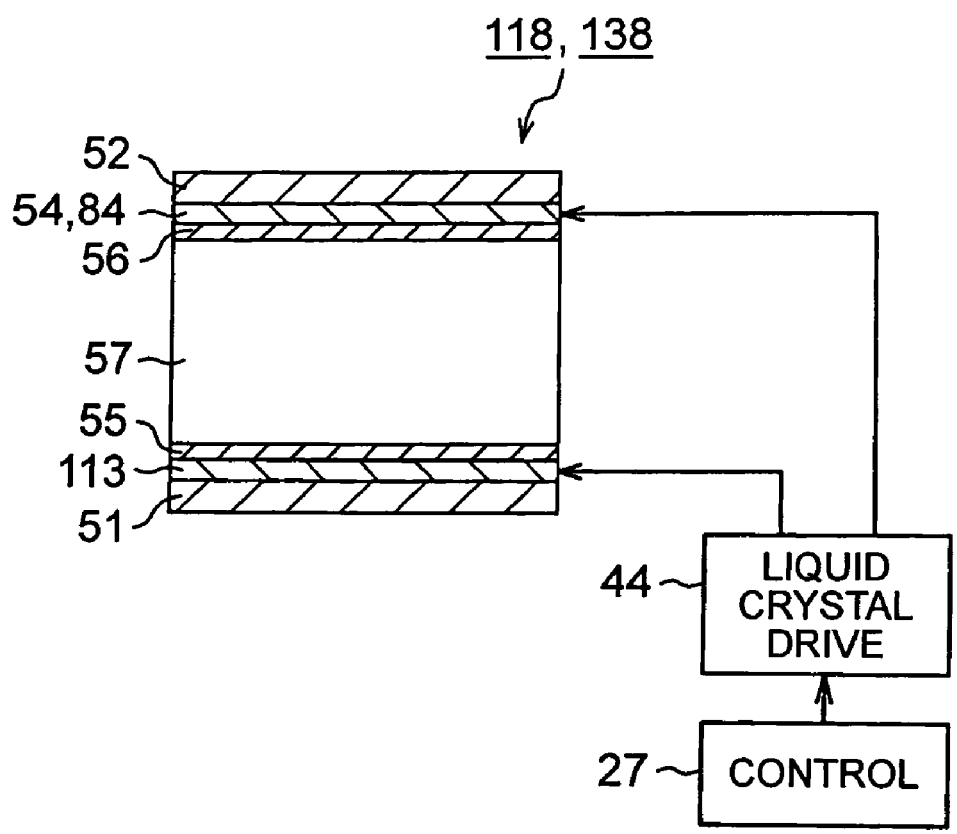
FIG. 15 is a sectional view of a variant of the liquid-crystal optical element included in the optical pickup according to the present invention.

The liquid-crystal optical element 118 is provided to adjust the amount of aberrations such as spherical aberration, astigmatism, coma and the like by varying the refractive index thereof. As shown in FIG. 15, the liquid-crystal optical element 118 is formed from first and second glass substrates 51 and 52 disposed opposite to each other, first and second electrodes 113 and 54 formed on the opposite surfaces of the first and second glass substrates 51 and 52 and having their respective electrode patterns, and a layer 57 of liquid crystal molecules disposed between the first and second electrodes 113 and 54 and aligned with alignment layers 55 and 56 laid inside the first and second electrode 113 and 54.

Figure 16:
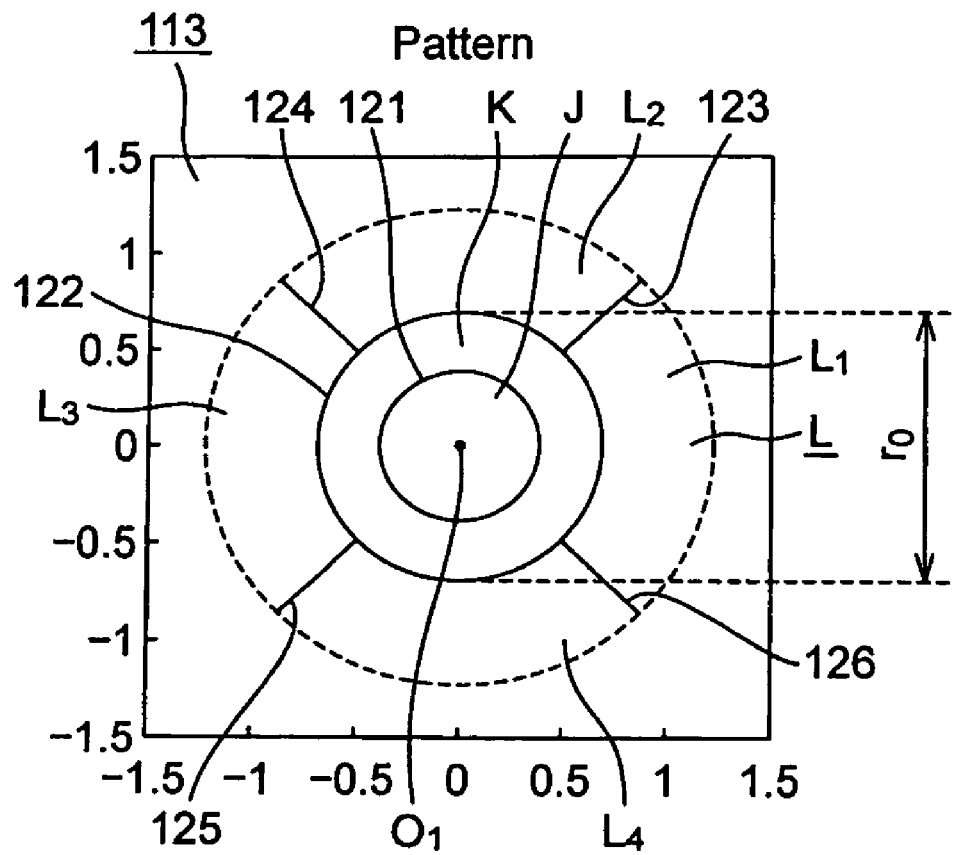
FIG. 16 is a plan view of another example of the one electrode pattern in the liquid-crystal optical element included in the optical pickup according to the present invention.

As shown in FIG. 16, the first electrode 113 provided on one (51) of the glass substrates has a seventh electrode pattern to dive the first electrode 113 into a plurality of zones, and an eighth electrode pattern to dive the first electrode 113 provided outside the seventh electrode pattern into a plurality of zones.

The seventh electrode pattern is to correct spherical aberration, and it includes thirtieth and thirty-first boundaries 121 and 122 that are nearly circular and concentric with each other about the optical axis O1. That is, the first electrode 113 is divided by the thirtieth and thirty-first boundaries 121 and 122 into zones J, K and L.

The eighth electrode pattern is to correct astigmatism. It is formed from thirty-second to thirty-fifth boundaries 123, 124, 125 and 126 formed linear radially from the optical axis O1 and that divide the zone outside the thirty-first boundary 122 on the first electrode 113, that is, the zone L. The thirty-second to thirty-fifth boundaries 123, 124, 125 and 126 are disposed with angles formed between two adjacent ones of the boundaries being equal to each other for astigmatism. The angle between the two adjacent boundaries is about 90 deg. The zone L of the first electrode 113 is subdivided by the thirty-second to thirty-fifth boundaries 123, 124, 125 and 126 into four equal zones L1, L2, L3 and L4. The second electrode 54 provided on the other glass substrate 52 is similar to that included in the liquid-crystal optical element 38 and so will not be described in detail.

Note here that the thirty-first boundary 122 on the first electrode 113 and eleventh boundary 71 on the second electrode 54 are formed in nearly same positions, respectively, that is, have nearly same radii r0 about the optical axes O1 and O2, respectively.

The liquid-crystal optical element 118 includes a liquid crystal drive 44 to drive and control a potential applied to the seventh, eighth, third and fourth electrode patterns formed on the first and second electrodes 113 and 54. Receiving a signal from the controller 27, the liquid crystal drive 44 controls the potential applied to each of the zones resulted from division of the seventh, eighth, third and fourth electrode patterns. Thus, the liquid crystal derive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 118 is controlled by the liquid crystal drive 44 to have the light beam passing by each zone vary in optical path length and generate a phase difference which is to be added to the wavefront of the aberration.

At the first electrode 113, the zones L1 and L3 are supplied with the same drive signal and applied with the same potential by the liquid crystal drive 44. Also, the zones L2 and L4 are supplied with the same drive signal and applied with the same potential by the liquid crystal drive 44.

At the first electrode 113, the necessary signals for driving the zones resulted from division by the seventh and eighth electrode patterns are in four kinds including signals for driving and controlling the potential applied to each of the zones J and K in addition to the aforementioned two kinds of signals.

At the second electrode 54, the zones D1, F1 and F2 are supplied with the same drive signal and applied with the same potential by the liquid crystal drive 44. Also, the zones D2 and F3 are supplied with the same drive signal and applied with the same potential by the liquid crystal drive 44. Further, the zones D3 and F4 are supplied with the same drive signal and applied with the same potential by the liquid crystal drive 44.

At the second electrode 54, the necessary signals for driving the zones resulted from division by the third and fourth electrode patterns are in four kinds including a signal for driving and controlling the potential applied to the zone E in addition to the aforementioned three kinds of signals.

When correcting spherical aberration, the potential applied to the zone K of the first electrode 113 and zone E of the second electrode 54 is controlled by the controller 27 and liquid crystal drive 44 and thus the liquid-crystal optical element 118 corrects the spherical aberration by adding a phase difference to the wavefront of the spherical aberration.

Also, when correcting astigmatism, the potential applied to the zones L1 and L3 and zones L2 and L4 of the first electrode 113 is controlled by the controller 27 and liquid crystal drive 44 and thus the liquid-crystal optical element 118 corrects the astigmatism by adding a phase difference to the wavefront of the astigmatism.

Further, when correcting coma, the potential applied to the zones D2 and F3 and zones D3 and F4 of the second electrode 54 is controlled by the controller 27 and liquid crystal drive 44 and thus the liquid-crystal optical element 118 corrects the coma by adding a phase difference to the wavefront of the coma.

In the optical pickup 111 according to the present invention, spherical aberration, astigmatism and coma can well be corrected by the liquid-crystal optical element 118 having the seventh and third electrode patterns to correct spherical aberration, eighth electrode pattern to correct astigmatism and fourth electrode pattern to correct coma and that controls each of the zones resulted from division by these electrode patterns independently. Therefore, the electrode patterns in the liquid-crystal optical element can be simplified, the liquid-crystal optical element can thus be controlled more simply, and spherical aberration, astigmatism and coma can be corrected optimally by the single liquid-crystal optical element. The optical pickup 111 according to the present invention can thus record and reproduce data to and from a recording medium with an improved performance.

Note that since at the liquid-crystal optical element 118, the thirty and thirty-first boundaries 121 and 122 on the seventh electrode pattern and the eleventh and twelfth boundaries 71 and 72 on the third electrode pattern, that is, positions where the spherical aberration-correcting pattern is to be divided, are located similarly to the first and second boundaries 61 and 62 on the first electrode pattern and the eleventh and twelfth boundaries 71 and 72 on the third electrode pattern at the liquid-crystal optical element 38, they will not be described in detail.

As above, the liquid-crystal optical element 118 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone K of the first electrode 113 is changed. Also, when the second optical disk 4 is loaded, the potential applied to a combination of the zone K of the first electrode 113 and zone E of the second electrode 54 is changed. By controlling the voltage applied to the seventh and third electrode patterns, that is, the voltage applied to the zones resulted from division by these electrode patterns, the liquid-crystal optical element 118 can optimally adjust the spherical aberration with a simple control correspondingly to the type of an optical disk in consideration.

In the optical pickup 111 according to the present invention, since a combination of those of the zones resulted from division by the seventh and third spherical aberration-correcting electrode patterns in the liquid-crystal optical element 118, which are driven under the same condition, is selected correspondingly to the type of an optical disk in consideration, spherical aberration can be corrected suitably for the first and second optical disks different in format from each other.

In the optical pickup 111 constructed as above, the optical paths of light beams emitted from the first and second light sources 31 and 32 pass by the liquid-crystal optical element 118 (38 in the optical pickup 1) and are subjected to correction of spherical aberration, astigmatism and coma as in the optical pickup 1. So, the optical paths will not be described in detail.

In the optical pickup 111 according to the present invention, spherical aberration, astigmatism and coma can optimally be corrected by the single liquid-crystal optical element 118 without complicated electrode patterns in the liquid-crystal optical element 118 and also without complicated control of the liquid crystal drive 44 that drives the liquid-crystal optical element 118. That is, in the optical pickup 111 according to the present invention, the spherical aberration, astigmatism and coma can be controlled independently and well corrected by controlling each of the zones resulted from division by the electrode patterns. Thus, the electrode patterns in the liquid-crystal optical element can be simplified to drive and control the liquid-crystal optical element more simply, and the spherical aberration, astigmatism and coma can optimally be corrected by the single liquid-crystal optical element to thereby record and/or reproduce data to and/or from the optical disk with an improved performance.

Also, in the optical pickup 111 according to the present invention, spherical aberration can be corrected optimally for the first and second optical disks 3 and 4 different in format from each other. That is, the optical pickup 111 according to the present invention can record and/or reproduce data to and/or from such optical disks having the different formats with the improved performance and can have the optical elements and circuits thereof constructed more simply.

Further, the optical pickup 111 according to the present invention can be designed more compact through simplification of its construction.

Note that although the aforementioned optical pickups 81 and 111 use the liquid-crystal optical element in which one of the first and second electrodes 53 and 54 of the optical pickup 1 has another example of the electrode pattern, the liquid-crystal optical element may have the first electrode 113 and second electrode 84.

Next, an optical pickup 131 using the first electrode 113 and second electrode 84 will be described with reference to FIG. 5. It should be noted that the same elements in this optical pickup 131 as those in the optical pickups 1, 81 and 111 will be indicated with the same reference numerals as those used in the illustration and description of the optical pickups 1, 81 and 111 and will not be described in detail.

As shown in FIG. 5, the optical pickup 131 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and combine the optical path of the first light beam with that of the second light beam emitted from the second light source 32, a second beam splitter 35 as an optical path splitting means to change and guide the optical paths of the first and second light beams, joined together by the first beam splitter 34, to the objective lens 33, and split the optical path of the return light from the optical disk from the that of the first or second light beam emitted from the first or second light source 31 or 32 and traveling forward, and a photodetector 36 to detect the return light split by the second beam splitter 35 from the forward traveling light beam.

Also, the optical pickup 131 includes a mirror 37 as an upward reflecting means provided between the objective lens 33 and second beam splitter 35 to reflect the first and second light beams at about 90 deg. toward the objective lens 33, a liquid-crystal optical element 138 provided between the mirror 37 and objective lens 33 to adjust the amount of each of spherical aberration by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 138 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

The liquid-crystal optical element 138 is provided to adjust the amount of aberrations such as spherical aberration, astigmatism, coma and the like by varying the refractive index thereof. As shown in FIG. 15, the liquid-crystal optical element 138 is formed from first and second glass substrates 51 and 52 disposed opposite to each other, first and second electrodes 113 and 84 formed on the opposite surfaces of the first and second glass substrates 51 and 52 and having their respective electrode patterns, and a layer 57 of liquid crystal molecules disposed between the first and second electrodes 113 and 84 and aligned with alignment layers 55 and 56 laid inside the first and second electrode 113 and 54. The first electrode 113 provided on one (51) of the glass substrates is similar to the liquid-crystal optical element 118, and so will not be described in detail. Also, since the second electrode 84 provided on the other glass substrate 52 is similar to the second electrode in the liquid-crystal optical element 88, it will not be described in detail.

Note here that the thirty-first boundary 122 on the first electrode 113 and nineteenth boundary 91 on the second electrode 84 are formed in nearly same positions, respectively, that is, have nearly same radii r0 about the optical axes O1 and O2, respectively.

The liquid-crystal optical element 138 includes a liquid crystal drive 44 to drive and control a potential applied to the seventh, eighth, fifth and sixth electrode patterns formed on the first and second electrodes 113 and 84. Receiving a signal from the controller 27, the liquid crystal drive 44 controls the potential applied to each of the zones resulted from division of the seventh, eighth, third and fourth electrode patterns. Thus, the liquid crystal derive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 138 is controlled by the liquid crystal drive 44 to have the light beam passing by each zone vary in optical path length and generate a phase difference which is to be added to the wavefront of the aberration.

At the first electrode 113, the zones L1 and L3 are supplied with the same drive signal and applied with the same potential by the liquid crystal drive 44. Also, the zones L2 and L4 are supplied with the same drive signal and applied with the same potential by the liquid crystal drive 44.

At the first electrode 113, the necessary signals for driving the zones resulted from division by the seventh and eighth electrode patterns are in four kinds including signals for driving and controlling the potential applied to each of the zones J and K in addition to the aforementioned two kinds of signals.

At the second electrode 84, the zones G2 and I1 are supplied with the same drive signal and applied with the same potential by the liquid crystal drive 44. Also, the zones G3 and I2 are supplied with the same drive signal and applied with the same potential by the liquid crystal drive 44. Further, the zones G4 and I3 are supplied with the same drive signal and applied with the same potential by the liquid crystal drive 44. Also, the zones G5 and I4 are supplied with the same drive signal and applied with the same potential by the liquid crystal drive 44.

At the second electrode 84, the necessary signals for driving the zones resulted from division by the fifth and sixth electrode patterns are in six kinds including signals for driving and controlling the potential applied to each of the zones G1 and H in addition to the aforementioned four kinds of signals.

When correcting spherical aberration, the potential applied to the zones K of the first electrode 113 and zone H of the second electrode 84 is controlled by the controller 27 and liquid crystal drive 44 and thus the liquid-crystal optical element 138 corrects the spherical aberration by adding a phase difference to the wavefront of the spherical aberration.

Also, when correcting astigmatism, the potential applied to the zones L1 and L3 and zones L2 and L4 of the first electrode 113 is controlled by the controller 27 and liquid crystal drive 44 and thus the liquid-crystal optical element 138 corrects the astigmatism by adding a phase difference to the wavefront of the astigmatism.

Further, when correcting coma, the potential applied to the zones G2 and I1, zones G3 and I2, zones G4 and I3 and zones G5 and I4 of the second electrode 84 is controlled by the controller 27 and liquid crystal drive 44 and thus the liquid-crystal optical element 138 corrects the coma by adding a phase difference to the wavefront of the coma.

In the optical pickup 131 according to the present invention, spherical aberration, astigmatism and coma can well be corrected by the liquid-crystal optical element 138 having the seventh and fifth electrode patterns to correct spherical aberration, eighth electrode pattern to correct astigmatism and sixth electrode pattern to correct coma and that controls each of the zones resulted from division by these electrode patterns independently. Therefore, the electrode patterns in the liquid-crystal optical element can be simplified, the liquid-crystal optical element can thus be controlled more simply, and spherical aberration, astigmatism and coma can be corrected optimally by the single liquid-crystal optical element. The optical pickup 131 according to the present invention can thus record and reproduce data to and from a recording medium with an improved performance.

Note that since at the liquid-crystal optical element 138, the thirty and thirty-first boundaries 121 and 122 on the seventh electrode pattern and the nineteenth and twentieth boundaries 91 and 92 on the fifth electrode pattern, that is, positions where the spherical aberration-correcting pattern is to be divided, are located similarly to the first and second boundaries 61 and 62 on the first electrode pattern and the eleventh and twelfth boundaries 71 and 72 on the third electrode pattern at the liquid-crystal optical element 38, they will not be described in detail.

As above, the liquid-crystal optical element 138 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone K of the first electrode 113 is changed. Also, when the second optical disk 4 is loaded, the potential applied to the zone K of the first electrode 113 and zone H of the second electrode 84 is changed. By controlling the voltage applied to the seventh and fifth electrode patterns, that is, the voltage applied to the zones resulted from division by these electrode patterns, the liquid-crystal optical element 138 can optimally adjust the spherical aberration with a simple control correspondingly to the type of an optical disk.

In the optical pickup 131 according to the present invention, since a combination of those of the zones resulted from division by the seventh and fifth spherical aberration-correcting electrode patterns in the liquid-crystal optical element 138, which are driven under the same condition, is selected correspondingly to the type of an optical disk in consideration, spherical aberration can be corrected suitably for the first and second optical disks different in format from each other.

In the optical pickup 131 constructed as above, the optical paths of light beams emitted from the first and second light sources 31 and 32 pass by the liquid-crystal optical element 138 (38 in the optical pickup 1) and are subjected to correction of spherical aberration, astigmatism and coma as in the optical pickup 1. So, the optical paths will not be described in detail.

In the optical pickup 131 according to the present invention, spherical aberration, astigmatism and coma can optimally be corrected by the single liquid-crystal optical element 138 without complicated electrode patterns in the liquid-crystal optical element 138 and also without complicated control of the liquid crystal drive 44 that drives the liquid-crystal optical element 138. That is, in the optical pickup 131 according to the present invention, the spherical aberration, astigmatism and coma can be controlled independently and well corrected by controlling each of the zones resulted from division by the electrode patterns. Thus, the electrode patterns in the liquid-crystal optical element can be simplified to drive and control the liquid-crystal optical element more simply, and the spherical aberration, astigmatism and coma can optimally be corrected by the single liquid-crystal optical element to thereby record and/or reproduce data to and/or from the optical disk with an improved performance.

Also, in the optical pickup 131 according to the present invention, spherical aberration can be corrected optimally for the first and second optical disks 3 and 4 different in format from each other. That is, the optical pickup 131 according to the present invention can record and/or reproduce data to and/or from such optical disks having the different formats with the improved performance and can have the optical elements and circuits thereof constructed more simply.

Further, the optical pickup 131 according to the present invention can be designed more compact through simplification of its construction.

Note that although the aforementioned optical pickup 1 (81, 111 and 131), the liquid-crystal optical elements 38 (88, 118 and 138) includes the first electrode 53 (113) having the electrode patterns to correct spherical aberration and electrode patterns to correct astigmatism, and the second electrode 54 (84) having the electrode patterns to correct spherical aberration and electrode patterns to correct coma, the present invention is not limited to this construction but the liquid-crystal optical element may include a first electrode having electrode patterns to correct astigmatism and a second electrode having electrode patterns to correct spherical aberration and electrode patterns to correct coma.

Next, an optical pickup 151 including a first electrode having electrode patterns to correct astigmatism, and second electrode having electrode patterns to correct spherical aberration and electrode patterns to connect coma will be described with reference to FIG. 5. It should be noted that the same elements of the optical pickup 151 as those of the optical pickup 1 will be indicated with the same reference numerals as used in the description of the optical pickup 1 and will not be described in detail.

As shown in FIG. 5, the optical pickup 151 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and combine the optical path of the first light beam with that of the second light beam emitted from the second light source 32, a second beam splitter 35 as an optical path splitting means to change and guide the optical paths of the first and second light beams, joined together by the first beam splitter 34, to the objective lens 33, and split the optical path of the return light from the optical disk from the that of the first or second light beam emitted from the first or second light source 31 or 32 and traveling forward, and a photodetector 36 to detect the return light split by the second beam splitter 35 from the forward traveling light beam.

Also, the optical pickup 151 includes a mirror 37 as an upward reflecting means provided between the objective lens 33 and second beam splitter 35 to reflect the first and second light beams at about 90 deg. toward the objective lens 33, a liquid-crystal optical element 158 provided between the mirror 37 and objective lens 33 to adjust the amount of each of spherical aberration by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 138 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

Figure 17:
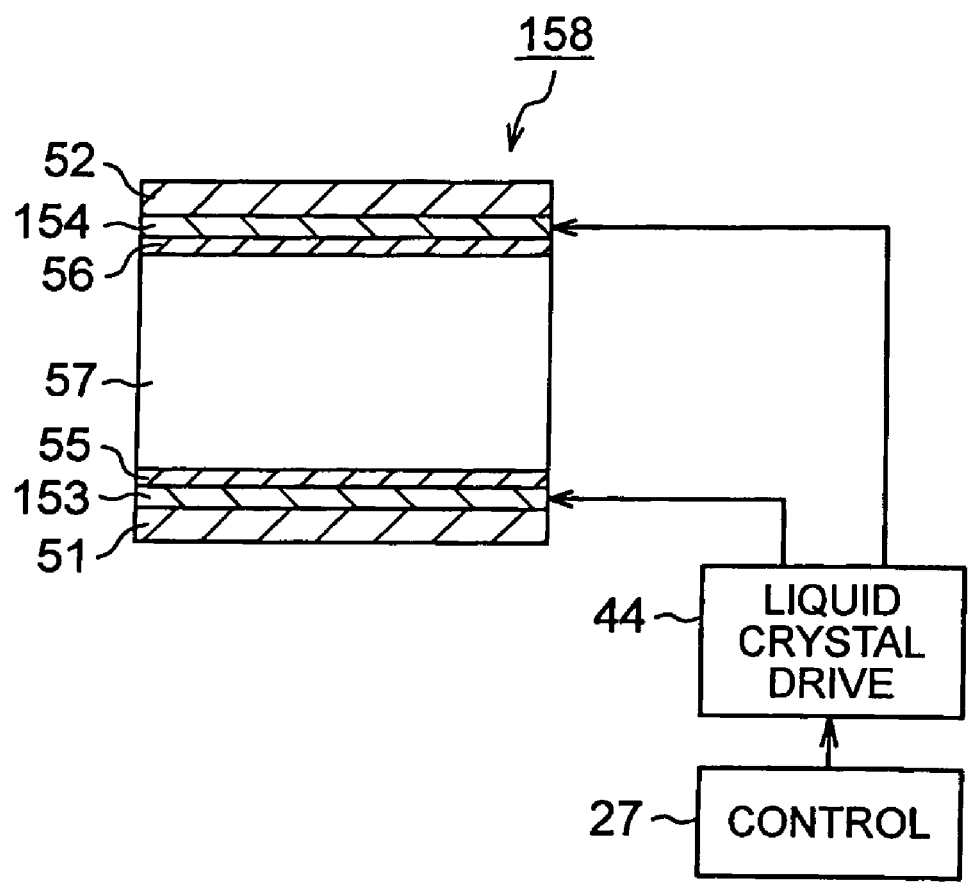
FIG. 17 is a sectional view of another variation of the liquid-crystal optical element included in the optical pickup according to the present invention.
Figure 18:
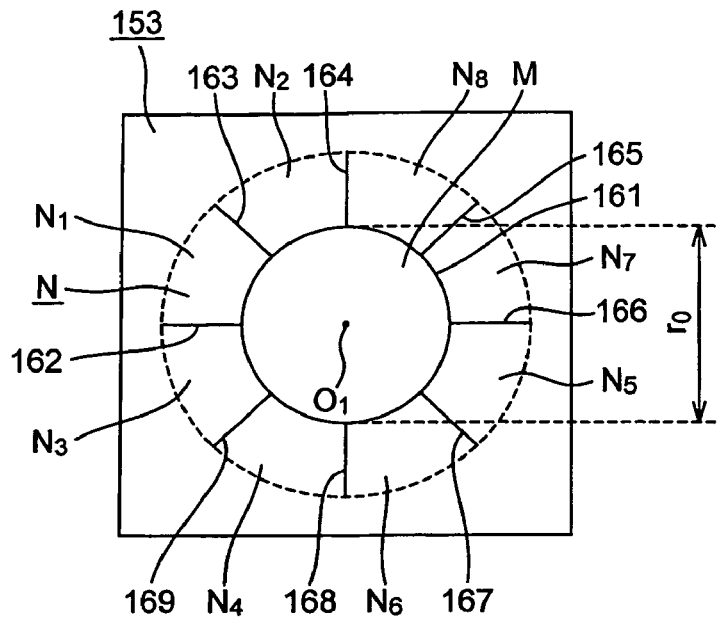
FIG. 18 is a plane view of still another example of the one electrode pattern in the liquid-crystal optical element included in the optical pickup according to the present invention.

The liquid-crystal optical element 158 is provided to adjust the amount of aberrations such as spherical aberration, astigmatism, coma and the like by varying the refractive index thereof. As shown in FIG. 17, the liquid-crystal optical element 158 is formed from first and second glass substrates 51 and 52 disposed opposite to each other, first and second electrodes 153 and 154 formed on the opposite surfaces of the first and second glass substrates 51 and 52 and having their respective electrode patterns, and a layer 57 of liquid crystal molecules disposed between the first and second electrodes 153 and 154 and aligned with alignment layers 55 and 56 laid inside the first and second electrode 153 and 154.

The first electrode 153 provided on one (51) of the glass substrates has the ninth electrode pattern that divides the first electrode 153 into a plurality of zones.

The above ninth electrode pattern is to correct astigmatism. It is formed from thirty-sixth boundary 161 formed nearly circular about the optical axis O1 and thirty-seventh to forty-fourth boundaries 162 to 169 formed linear radially from the optical axis O1 and that divide the zone outside the thirty-sixth boundary 161, that is, a zone N which will be described in detail later. That is, the first electrode 153 is divided by the first boundary 161 into zones M and N. The thirty-seventh to forty-fourth boundaries 162 to 169 are disposed with angles formed between two adjacent ones of the boundaries being equal to each other for astigmatism. The angle between the two adjacent boundaries is about 45 deg. The zone N of the first electrode 153 is subdivided by the thirty-seventh to forty-fourth boundaries 162 to 169 into eight equal zones N1, N2, N3, N4, N5, N6, N7 and N8.

Figure 19:
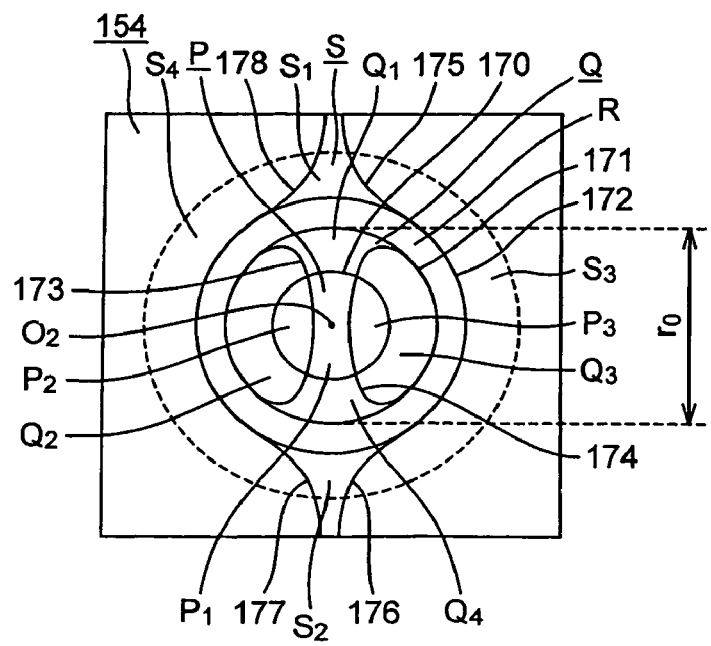
FIG. 19 is a plan view of still another example of the other electrode pattern in the liquid-crystal optical element included in the optical pickup according to the present invention.

The second electrode 154 provided on the other glass substrate 52 has the tenth and eleventh electrode patterns that divide the second electrode 154 into a plurality of zones as shown in FIG. 19.

The tenth electrode pattern is to correct spherical aberration, and it includes forty-fifth to forty-seventh boundaries 170, 171 and 172 that are nearly circular and concentric with each other about the optical axis O2. That is, the second electrode 154 is divided by the forty-fifth to forty-seventh boundaries 170, 171 and 172 into zones P, Q, R and S.

The eleventh electrode pattern is to correct coma. It is formed from forty-eighth and forty-ninth boundaries 173 and 174 that subdivide the zone inside the forty-sixth boundary 171 on the second electrode 154, that is, the zone P, into three equal zones, and the zone Q, into four equal zones, and fiftieth to fifty-third boundaries 175, 176, 177 and 178 that subdivide the zone outside the forth-seventh boundary 172 on the second electrode 154, that is, the zone S, into four equal zones.

The forty-eighth and forty-ninth boundaries 173 and 174 are shaped correspondingly to coma. The zone P of the second electrode 154 is subdivided by the forty-eighth and forty-ninth boundaries 173 and 174 into zones P1, P2 and P3. Also, the zone Q of the second electrode 154 is subdivided by the forty-eighth and forty-ninth boundaries 173 and 174 into zones Q1, Q2, Q3 and Q4. The fiftieth to fifty-third boundaries 175, 176, 177 and 178 are shaped correspondingly to coma. The zone S of the second electrode 154 is subdivided by the fiftieth to fifty-third boundaries 175, 176, 177 and 178 into zones S1, S2, S3 and S4.

Note here that the thirty-sixth boundary 161 provided on the first electrode 153 and forty-sixth boundary 171 provided on the second electrode 154 are formed in nearly same positions, respectively, that is, have nearly same radii r0 about the optical axes O1 and O2, respectively.

The liquid-crystal optical element 158 includes a liquid crystal drive 44 to drive and control a potential applied to the ninth, tenth and eleventh electrode patterns formed on the first and second electrodes 153 and 154. Receiving a signal from the controller 27, the liquid crystal drive 44 controls the potential applied to each of the zones resulted from division of the ninth, tenth and eleventh electrode patterns. Thus, the liquid crystal derive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 158 is controlled by the liquid crystal drive 44 to have the light beam passing by each zone vary in optical path length and generate a phase difference which is to be added to the wavefront of the aberration.

At the first electrode 153, the zones N1 and N5 are supplied with the same drive signal and applied with the same potential by the liquid crystal drive 44. Also, the zones N2 and N6 are supplied with the same drive signal and applied with the same potential by the liquid crystal drive 44. Further, the zones N3 and N7 are supplied with the same drive signal and applied with the same potential by the liquid crystal drive 44. Also, the zones N4 and N8 are supplied with the same drive signal and applied with the same potential by the liquid crystal drive 44.

At the first electrode 153, the necessary signals for driving the zones resulted from division by the ninth electrode pattern are in five kinds including a signal for driving and controlling the potential applied to the zone M in addition to the aforementioned four kinds of signals.

At the second electrode 154, the zones P1, S1 and S2 are supplied with the same drive signal and applied with the same potential by the liquid crystal drive 44. Also, the zones P2 and S3 are supplied with the same drive signal and applied with the same potential by the liquid crystal drive 44. Further, the zones P3 and S4 are supplied with the same drive signal and applied with the same potential by the liquid crystal drive 44. Also, the zones Q1 and Q4 are supplied with the same drive signal and applied with the same potential by the liquid crystal drive 44.

At the second electrode 154, the necessary signals for driving the zones resulted from division by the tenth and eleventh electrode patterns are in six kinds including signals for driving and controlling the potential applied to each of the zones Q2 and Q3 in addition to the aforementioned four kinds of signals.

When correcting spherical aberration, the potential applied to the zone Q (Q1, Q2, Q3 and Q4) of the second electrode 154 and zone R of the second electrode 154 is controlled by the controller 27 and liquid crystal drive 44 and thus the liquid-crystal optical element 158 corrects the spherical aberration by adding a phase difference to the wavefront of the spherical aberration.

Also, when correcting astigmatism, the potential applied to the zones N1 and N5, zones N2 and N6, zones N3 and N7 and zones N4 and N8 of the first electrode 153 is controlled by the controller 27 and liquid crystal drive 44 and thus the liquid-crystal optical element 158 corrects the astigmatism by adding a phase difference to the wavefront of the astigmatism.

Further, when correcting coma, the potential applied to the zones P2, Q2 and S3, P3, Q3 and S4 of the second electrode 154 is controlled by the controller 27 and liquid crystal drive 44 and thus the liquid-crystal optical element 158 corrects the coma by adding a phase difference to the wavefront of the coma.

In the optical pickup 151 according to the present invention, spherical aberration, astigmatism and coma can well be corrected by the liquid-crystal optical element 158 having the tenth electrode pattern to correct spherical aberration, ninth electrode pattern to correct the astigmatism and eleventh electrode pattern to correct coma and that controls each of the zones resulted from division by these electrode patterns independently. Therefore, the electrode patterns in the liquid-crystal optical element can be simplified, the liquid-crystal optical element can thus be controlled more simply, and spherical aberration, astigmatism and coma can be corrected optimally by the single liquid-crystal optical element. The optical pickup 151 according to the present invention can thus record and reproduce data to and from a recording medium with an improved performance.

Note that since at the liquid-crystal optical element 158, the forty-fifth to forty-seventh boundaries 170, 171 and 172 on the tenth electrode pattern, that is, positions where the spherical aberration-correcting pattern is to be divided, are located similarly to the first boundary 61 on the first electrode pattern, second boundary 62 on the first electrode pattern (eleventh boundary 71 on the third electrode pattern) and the twelfth boundary 72 on the third electrode pattern at the liquid-crystal optical element 38, they will not be described in detail.

As above, the liquid-crystal optical element 158 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone Q of the second electrode 154 is changed. Also, when the second optical disk 4 is loaded, the potential applied to the zones Q and R of the second electrode 154 in combination is changed. By controlling the voltage applied to the tenth electrode pattern, that is, the voltage applied to the zones resulted from this electrode pattern, the liquid-crystal optical element 158 can optimally adjust the spherical aberration simply correspondingly to the type of an optical disk in consideration.

In the optical pickup 151 according to the present invention, since a combination of those of the zones resulted from division by the tenth spherical aberration-correcting electrode pattern in the liquid-crystal optical element 158, which are driven under the same condition, is selected correspondingly to the type of an optical disk in consideration, spherical aberration can be corrected suitably for the first and second optical disks different in format from each other.

In the optical pickup 151 constructed as above, the optical paths of light beams emitted from the first and second light sources 31 and 32 pass by the liquid-crystal optical element 158 (38 in the optical pickup 1) and are subjected to correction of spherical aberration, astigmatism and coma as in the optical pickup 1. So, the optical paths will not be described in detail.

In the optical pickup 151 according to the present invention, spherical aberration, astigmatism and coma can optimally be corrected by the single liquid-crystal optical element 158 without complicated electrode patterns in the liquid-crystal optical element 158 and also without complicated control of the liquid crystal drive 44 that drives the liquid-crystal optical element 158. That is, in the optical pickup 151 according to the present invention, the spherical aberration, astigmatism and coma can be controlled independently and well corrected by controlling each of the zones resulted from division by the electrode patterns. Thus, the electrode patterns in the liquid-crystal optical element can be simplified to drive and control the liquid-crystal optical element more simply, and the spherical aberration, astigmatism and coma can optimally be corrected by the single liquid-crystal optical element to thereby record and/or reproduce data to and/or from the optical disk with an improved performance.

Also, in the optical pickup 151 according to the present invention, spherical aberration can be corrected optimally for the first and second optical disks 3 and 4 different in format from each other. That is, the optical pickup 151 according to the present invention can record and/or reproduce data to and/or from such optical disks having the different formats with the improved performance and can have the optical elements and circuits thereof constructed more simply.

Further, the optical pickup 151 according to the present invention can be designed more compact through simplification of its construction.

Note that although the aforementioned optical pickup 1 (81, 111, 131 and 151) is designed to correct spherical aberration for the first and second optical disks 3 and 4 different in format from each other, they may be adapted to correct coma for the first and second optical disks different in format from each other.

Next, an optical pickup 181 using first and second electrodes capable of correcting coma for the first and second optical disks different in format from each other, that is, a first electrode having electrode patterns that correct spherical aberration and electrode patterns that correct astigmatism, and a second electrode having electrode patterns that correct spherical aberration and coma will be described with reference to FIG. 5. It should be noted that the same elements in this optical pickup 181 as those in the optical pickup 1 will be indicated with the same reference numerals as those used in the illustration and description of the optical pickup 1 and will not be described in detail.

As shown in FIG. 5, the optical pickup 181 according to the present invention includes a first light source 31 such as a semiconductor laser or the like to emit a first light beam of a first wavelength, a second light source 32 such as a semiconductor laser or the like to emit a second laser beam of a second wavelength, an objective lens 33 to focus the first or second light beam emitted from the first or second light source 31 or 32 on the signal recording surface of the optical disk 11, a first beam splitter 34 as an optical path joining means to guide, by deflecting, the optical path of the first light beam emitted from the first light source 31 to the objective lens 33 and combine the optical path of the first light beam with that of the second light beam emitted from the second light source 32, a second beam splitter 35 as an optical path splitting means to change and guide the optical paths of the first and second light beams, joined together by the first beam splitter 34, to the objective lens 33, and split the optical path of the return light from the optical disk from the that of the first or second light beam emitted from the first or second light source 31 or 32 and traveling forward, and a photodetector 36 to detect the return light split by the second beam splitter 35 from the forward traveling light beam.

Also, the optical pickup 181 includes a mirror 37 as an upward reflecting means provided between the objective lens 33 and second beam splitter 35 to reflect the first and second light beams at about 90 deg. toward the objective lens 33, a liquid-crystal optical element 188 provided between the mirror 37 and objective lens 33 to adjust the amount of each of spherical aberration by varying its refractive index, and a collimator lens 39 provided between the mirror 37 and second beam splitter 35 to change the angle of divergence of the first and second light beams whose optical paths have been changed by the second beam splitter 35 to provide a parallel beam. It should be noted that although the liquid-crystal optical element 188 is provided between the mirror 37 and objective lens 33, the present invention is not limited to this geometry but it may be disposed on the optical path between the first beam splitter 34 and objective lens 33.

Also, between the second beam splitter 35 and photodetector 36, there is provided a cylinder lens 41 to focus the return light from the optical disk 11 onto the photodetector 36 by adjusting the light-path length of the return light.

The liquid-crystal optical element 188 is provided to adjust the amount of aberrations such as spherical aberration, astigmatism, coma and the like by varying the refractive index thereof. As shown in FIG. 6, the liquid-crystal optical element 188 is formed from first and second glass substrates 51 and 52 disposed opposite to each other, first and second electrodes 53 and 184 formed on the opposite surfaces of the first and second glass substrates 51 and 52 and having their respective electrode patterns, and a layer 57 of liquid crystal molecules disposed between the first and second electrodes 53 and 184 and aligned with alignment layers 55 and 56 laid inside the first and second electrode 53 and 184. The first electrode 53 provided on one (51) of the glass substrates is similar to the liquid-crystal optical element 38, and so will not be described in detail.

Figure 20:
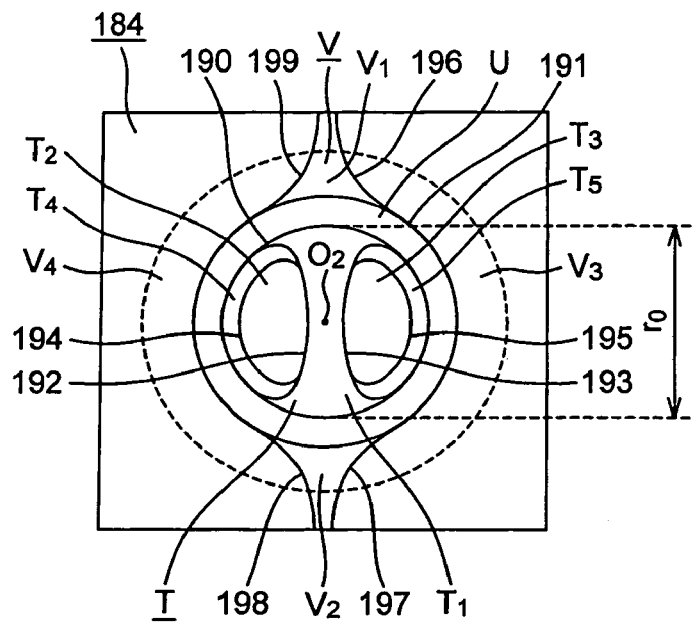
FIG. 20 is a plan view of the other electrode pattern capable of coma correction for different formats of the liquid-crystal optical element included in the optical pickup according to the present invention.

As shown in FIG. 20, the second electrode 184 provided on the other glass substrate 52 has a twelfth electrode pattern to divide the second electrode 184 into a plurality of zones, and a thirteenth electrode pattern to subdivide the zones inside and outside the twelfth electrode pattern.

The twelfth electrode pattern is to cooperate with the aforementioned first electrode pattern to correct spherical aberration. It includes fifty-fourth and fifty-fifth boundaries 190 and 191 generally circular and concentric with each other about an optical axis O2. That is, the second electrode 184 is divided by the fifty-fourth and fifty-fifth boundaries 190 and 191 into zones T, U and V.

The thirteenth electrode pattern is to correct coma. It includes fifty-sixth to fifty-ninth boundaries 192, 193, 194 and 195 that subdivide the zone inside the fifty-fourth boundary 190 of the second electrode 184, that is, the zone T, into five zones, and sixtieth to sixty-third boundaries 196, 197, 198 and 199 that subdivide the zone outside the fifty-fifth boundary 191 on the second electrode 184, that is, the zone V, into four zones.

The fifty-sixth and fifty-seventh boundaries 192 and 193 are shaped correspondingly to coma for the first and second optical disks 3 and 4. Also, the fifty-eighth and fifty-ninth boundaries 194 and 195 are shaped correspondingly to coma for the first optical disk 3. The zone T of the second electrode 184 is subdivided by the fifty-sixth to fifty-ninth boundaries 192 to 195 into zones T1, T2, T3, T4 and T5. The sixtieth to sixty-third boundaries 196, 197, 198 and 199 are shaped correspondingly to coma for the first and second optical disks 3 and 4. The zone V of the second electrode 184 is subdivided by sixtieth to sixty-third boundaries 196, 197, 198 and 199 into zones V1, V2, V3 and V4.

Note here that the second boundary 62 provided on the first electrode 53 and fifty-fourth boundary 190 provided on the second electrode 184 are formed in nearly same positions, respectively, that is, have nearly same radii r0 about the optical axes O1 and O2, respectively.

The liquid-crystal optical element 188 includes a liquid crystal drive 44 to drive and control a potential applied to the first, second, twelfth and thirteenth electrode patterns formed on the first and second electrodes 53 and 184. Receiving a signal from the controller 27, the liquid crystal drive 44 controls the potential applied to each of the zones resulted from division of the first, second, twelfth and thirteenth electrode patterns. Thus, the liquid crystal drive 44 can control the voltage between the first and second electrodes in each of the zones. The alignment of the liquid crystal molecules is biased correspondingly to an electric field formed by the voltage to vary the refractive index correspondingly to the electrode patterns. That is, the liquid-crystal optical element 188 is controlled by the liquid crystal drive 44 to have the light beam passing by each zone vary in optical path length and generate a phase difference which is to be added to the wavefront of the aberration.

At the first electrode 53, the zones C1 and C5 are supplied with the same drive signal and applied with the same potential by the liquid crystal drive 44. Also, the zones C2 and C6 are supplied with the same drive signal and applied with the same potential by the liquid crystal drive 44. Further, the zones C3 and C7 are supplied with the same drive signal and applied with the same potential by the liquid crystal drive 44. Also, the zones C4 and C8 are supplied with the same drive signal and applied with the same potential by the liquid crystal drive 44.

At the first electrode 53, the necessary signals for driving the zones resulted from division by the first and second electrode patterns are in six kinds including signals for driving and controlling the potential applied to each of the zones A and B in addition to the aforementioned four kinds of signals.

At the second electrode 184, the zones T1, V1 and V2 are supplied with the same drive signal and applied with the same potential by the liquid crystal drive 44. Also, the zones T2 and V3 are supplied with the same drive signal and applied with the same potential by the liquid crystal drive 44. Further, the zones T3 and V4 are supplied with the same drive signal and applied with the same potential by the liquid crystal drive 44.

At the second electrode 184, the necessary signals for driving the zones resulted from division by the twelfth and thirteenth electrode patterns are in six kinds including signals for driving and controlling the potential applied to each of the zones U, T4 and T5 in addition to the aforementioned three kinds of signals.

When correcting spherical aberration, the potential applied to the zone B of the first electrode 53 and zone U of the second electrode 184 and zone R of the second electrode 184 is controlled by the controller 27 and liquid crystal drive 44 and thus the liquid-crystal optical element 188 corrects the spherical aberration by adding a phase difference to the wavefront of the spherical aberration.

Also, when correcting astigmatism, the potential applied to the zones C1 and C5, zones C2 and C6, zones C3 and C7 and zones C4 and C8 of the first electrode 53 is controlled by the controller 27 and liquid crystal drive 44 and thus the liquid-crystal optical element 188 corrects the astigmatism by adding a phase difference to the wavefront of the astigmatism.

Further, when correcting coma, the potential applied to the zones T2 and V3, zones T3 and V4 and zones T4 and T5 of the second electrode 184 is controlled by the controller 27 and liquid crystal drive 44 and thus the liquid-crystal optical element 188 corrects the coma by adding a phase difference to the wavefront of the coma.

In the optical pickup 181 according to the present invention, spherical aberration, astigmatism and coma can well be corrected by the liquid-crystal optical element 188 having the first and twelfth electrode patterns to correct spherical aberration, second electrode pattern to correct the astigmatism and thirteenth electrode pattern to correct coma and that controls each of the zones resulted from division by these electrode patterns independently. Therefore, the electrode patterns in the liquid-crystal optical element can be simplified, the liquid-crystal optical element can thus be controlled more simply, and spherical aberration, astigmatism and coma can be corrected optimally by the single liquid-crystal optical element. The optical pickup 181 according to the present invention can thus record and reproduce data to and from a recording medium with an improved performance.

Note that since at the liquid-crystal optical element 188, the first and second boundaries 61 and 62 on the first electrode pattern and fifty-fourth and fifty-fifth boundaries 190 and 191 on the twelfth electrode pattern, that is, positions where the spherical aberration-correcting pattern is to be divided, are located similarly to the first and second boundaries 61 and 62 on the first electrode pattern in the aforementioned liquid-crystal optical element 38 and eleventh and twelfth boundaries 71 and 72 on the third electrode pattern, they will not be described in detail.

As above, the liquid-crystal optical element 188 is so controlled by the controller 27 and liquid crystal drive 44 that a combination of zones driven under the same condition will be selected correspondingly to the type of an optical disk identified by the disk discriminator 29. In this embodiment, when the first optical disk 3 is loaded in the optical disk drive, the potential applied to the zone B of the first electrode 53 is changed. Also, when the second optical disk 4 is loaded, the potential applied to the combination of the zone B of the first electrode 53 and zone U of the second electrode 184 is changed. By controlling the voltage applied to the tenth electrode pattern, that is, the voltage applied to the zones resulted from this electrode pattern, the liquid-crystal optical element 158 can optimally adjust the spherical aberration simply correspondingly to the type of an optical disk in consideration.

Next, there will be described positions of the fifty-sixth to fifty-ninth boundaries 192, 193, 194 and 195 and sixtieth to sixty-third boundaries 196, 197, 198 and 199 on the thirteenth electrode pattern in the liquid-crystal optical element 188, that is, positions of division by the electrode patterns for correction of coma.

Figure 21:
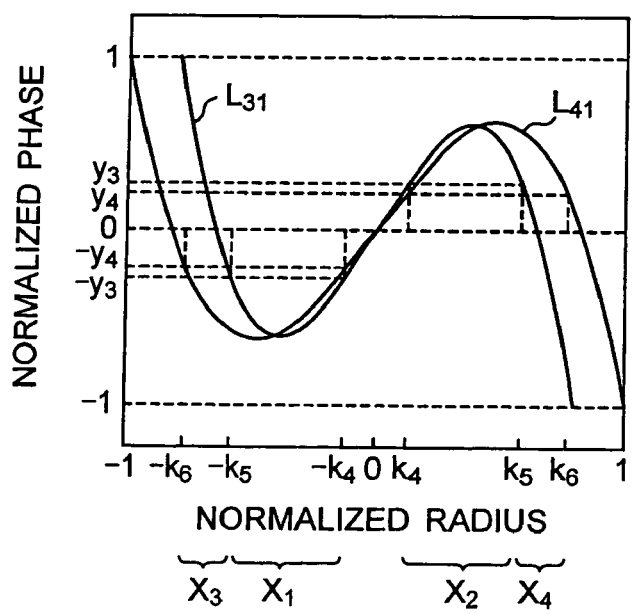
FIG. 21 shows the relation among the phase difference amount of coma occurring in the first and second light beams, first and second amounts of phase difference for correction of the coma by the liquid-crystal optical element, and normalized radius indicating the position of the boundary included in the electrode pattern to correct coma.

Generally, normalizing the coma taking the distance r from the center of a light beam as the horizontal axis and the phase distribution of the waveform as the vertical axis so that the maximum amount of phase difference is 1 (one) and an effective radius on which a position from the center (optical axes O1 and O2) of the light beam depends upon a numerical aperture is 1 (one) results in a phase distribution as indicated with a solid line $L_{41}$ shown in FIG. 21.

Since the coma of the first and second optical disks of different types is corrected by the single liquid-crystal optical element 188, the coma of the first and second optical disks 3 and 4 is normalized herein so that the effective radius of the second optical disk 4 whose numerical aperture is large is 1 (one). That is, the solid line $L_{41}$ shown in FIG. 21 represents a phase distribution of the wavefront of the spherical aberration of coma of the second optical disk 4 whose numerical aperture is large. The vertical axis indicates such normalization that the maximum amount of phase difference of the spherical aberration of the second optical disk 4 is 1 (one). Also, normalizing the phase distribution of the wavefront of the spherical aberration of coma of the first optical disk 3 so that the maximum amount of phase difference of the spherical aberration of the first optical disk 3 is 1 (one) and the effective radius on which a position from the center of the light beam depends upon the numerical aperture of the second optical disk 4 is 1 (one) results in a phase distribution as indicated with a dashed line $L_{31}$ in FIG. 21.

Figure 2:
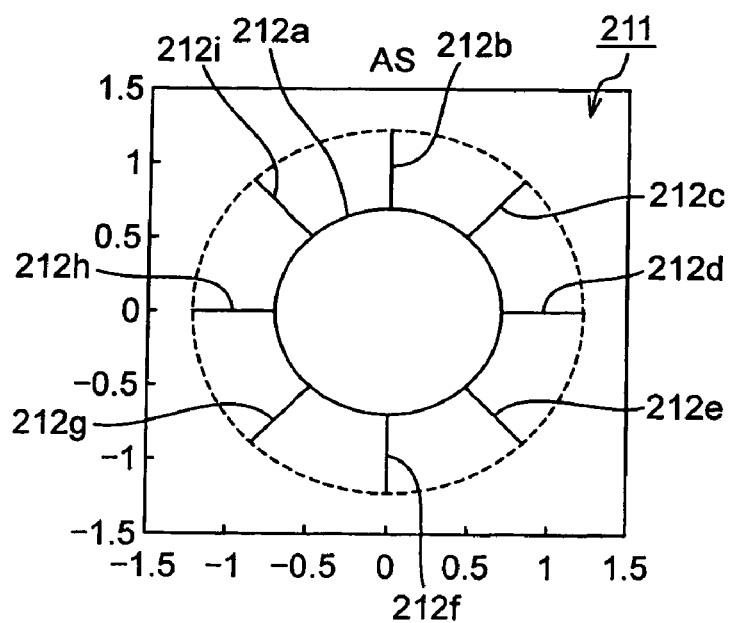
FIG. 2 is a plan view of an astigmatism-correcting electrode pattern in the liquid-crystal optical element included in the conventional optical pickup.
Figure 3:
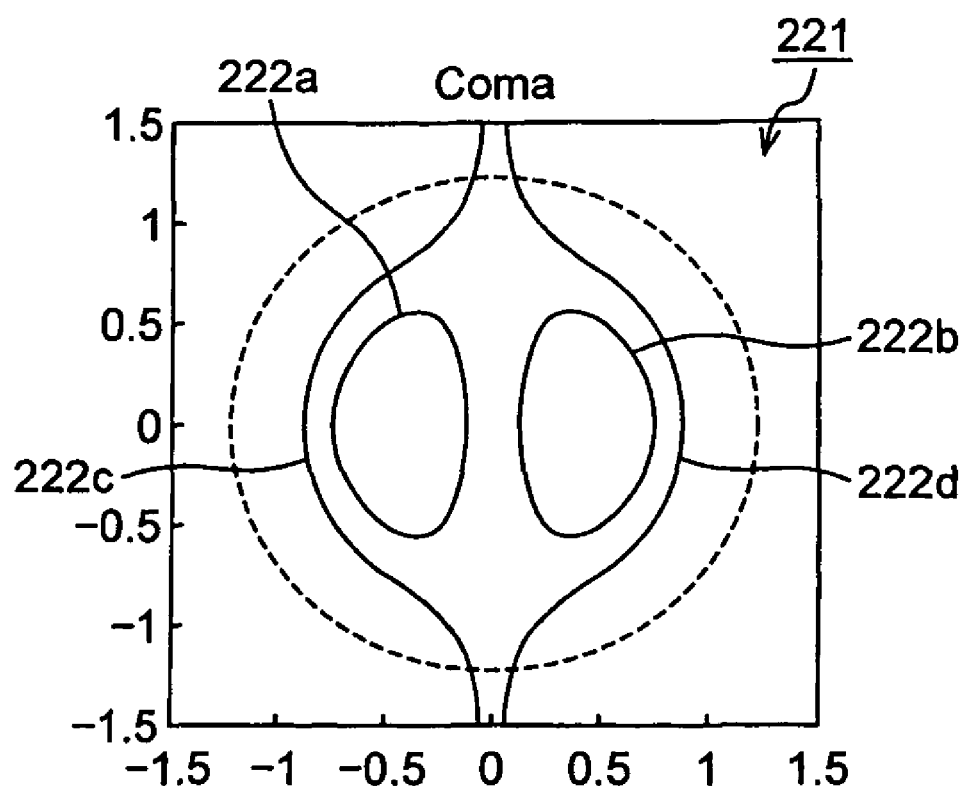
FIG. 3 is a plan view of a coma-correcting electrode pattern in the liquid-crystal optical element included in the conventional optical pickup.
Figure 4:
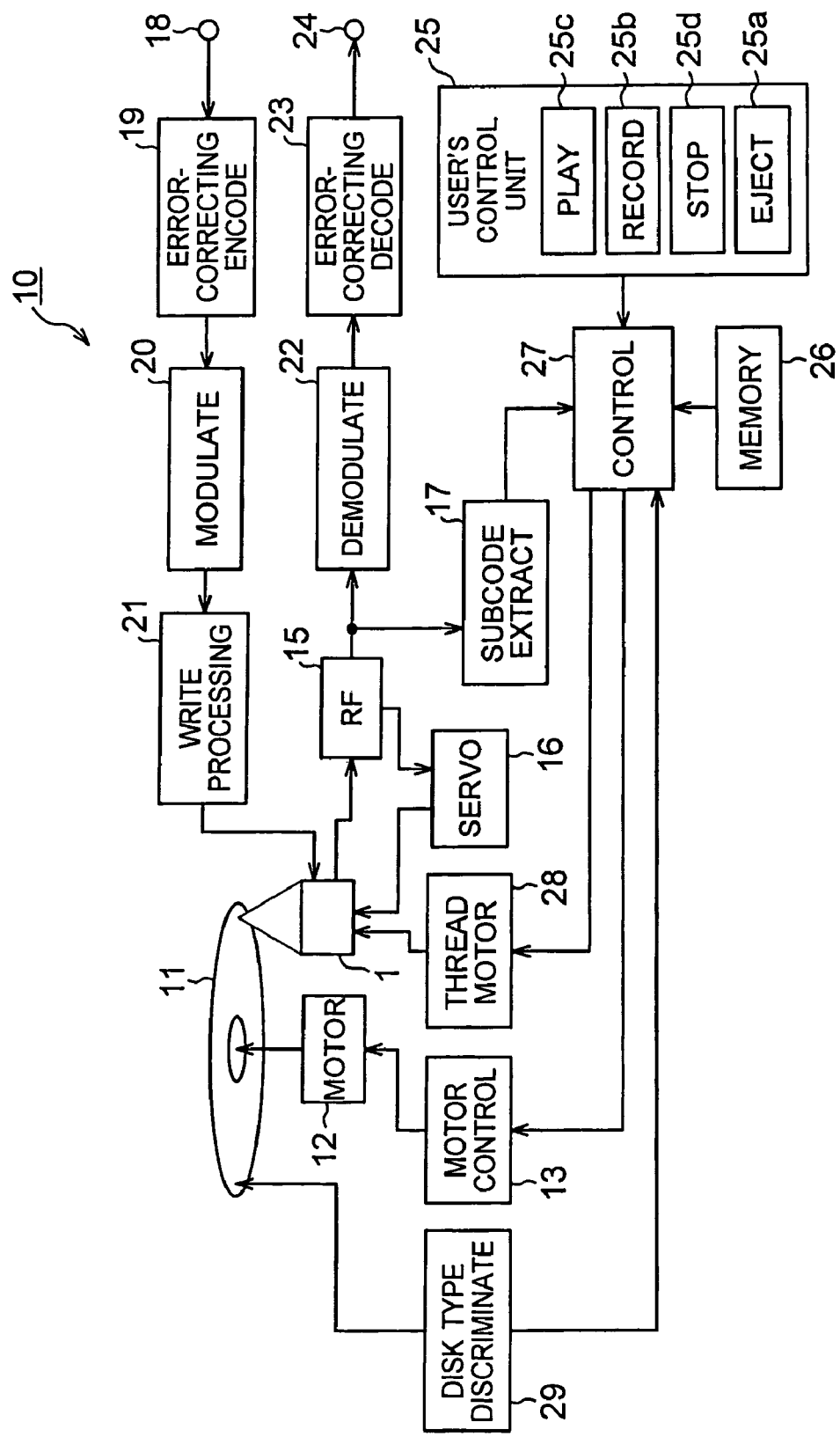
FIG. 4 is a block diagram of a recorder/player according to the present invention.

That is, the solid line $L_{41}$ in FIG. 21 represents a phase distribution of the wavefront of the coma of the second optical disk 4 whose numerical aperture is large. The vertical axis is such normalization that the maximum amount of phase difference of the spherical aberration of the second optical disk 4 is 1 (one). Also, normalization of the phase distribution of the wavefront of the first optical disk 3 so that the maximum amount of phase difference of the spherical aberration of the first optical disk 3 is 1 (one) and normalization of a position from the center of a light beam so that the effective radius depending upon the numerical aperture of the second optical disk 4 is 1 (one) will result in a phase distribution indicated with a solid line $L_{31}$ in FIG. 2.

The fifty-sixth and fifty-seventh boundaries 192 and 193 and sixtieth to sixty-third boundaries 196, 197, 198 and 199 are formed in positions where the phase difference of coma for the second optical disk 4 is equal in phase distribution to the second predetermined coma-correcting phase difference amount. More specifically, the positions of the fifty-sixth boundary 192 and sixtieth and sixty-first boundaries 196 and 197 are derived from normalized radii −k6 and −k4 with which the phase distribution of the coma of the second optical disk 4 takes a normalized value −y4 of the second coma-correcting phase difference amount. That is, the positions of the zones T2, T4 and V3 are determined based on the normalized radii −k6 and −k4 represented by X1 and X3 in FIG. 21. Similarly, the positions of the fifty-seventh boundary 193 and sixty-second and sixty-third boundaries 198 and 199 are derived from normalized radii k4 and k6 with which the phase distribution of the coma of the second optical disk 4 takes a normalized value y4 of the second coma-correcting phase difference amount. That is, the positions of the zones T3, T5 and V4 are determined based on the normalized radii k4 and k6 represented by X2 and X4 in FIG. 21.

Also, the fifty-eighth and fifty-ninth boundaries 194 and 195 are formed in positions where the phase difference of coma for the first optical disk 3 is equal in phase distribution to the first predetermined coma-correcting phase difference amount. More specifically, the position of the fifty-eighth boundary 194 is derived from normalized radii −k5 with which the phase distribution of coma of the first optical disk 3 takes a normalized radius −y3 of the first coma-correcting phase difference amount. That is, the position of the zone T2 is determined based on the normalized radii −k5 represented by X1 in FIG. 21 and above-mentioned normalized radius −k4. Similarly, the position of the fifty-ninth boundary 195 is derived from normalized radius k5 with which the phase distribution of the coma of the first optical disk 3 takes a normalized value y3 of the second coma-correcting phase difference amount. That is, the position of the zone T3 is determined based on a normalized radius k4 represented by X2 in FIG. 21 and above-mentioned normalized radius k5.

In the liquid-crystal optical element 188, when the optical disk is identified as the first optical disk 3 by the disk discriminator 29, the potential, namely, voltage, among the combination of the zones T2 and V3, combination of the zones T3 and V4, combination of the zones T1, U, V1 and V2, of the second electrode 184, zones T2 and V3, zones T3 and V4 and zones T1, U, V1 and V2 of the first electrode 53, is changed, the alignment of liquid crystal molecules in the liquid crystal molecule layer 57 is changed and thus the refractive index is varied. When the refractive index of the liquid crystal molecule layer 57 between the zones T2 and V3, zones T3 and V4 and the zones T1, U, V1 and V2 and the zones of the first electrode 53 opposite to the above zones, respectively, is varied, the first coma-correcting phase difference amount is added to the first light beam passing by the zones T2 and V3, zones T3 and V4 and the zones T1, U, V1 and V2 and thus the phase difference, that is, the amount of coma, is reduced. It should be noted that the variation of the voltage to be changed in this case is determined by the controller 27 supplied with a signal from the photodetector 36 and a predetermined potential with which the voltage will change by a predetermined amount is applied by the liquid crystal drive 44 to the zones T2 and V3, zones T3 and V4 and the zones T1, U, V1 and V2.

Also, in the liquid-crystal optical element 188, when the optical disk is identified as the second optical disk 4 by the disk discriminator 29, the potential, namely, voltage, among the combination of the zones T2, V4 and V3, combination of the zones T3, T5 and V4, combination of the zones T1, U, V1 and V2, of the second electrode 184, zones T2, T4 and V3, zones T3, T5 and V4 and zones T1, U, V1 and V2 of the first electrode 53, is changed, the alignment of liquid crystal molecules in the liquid crystal molecule layer 57 is changed and thus the refractive index is varied. When the refractive index of the liquid crystal molecule layer 57 between the zones T2, T4 and V3, zones T3, T5 and V4 and the zones T1, U, V1 and V2 of the second electrode 184 and the zones of the first electrode 53 opposite to the above zones, respectively, is varied, the second coma-correcting phase difference amount is added to the second light beam passing by the zones T2, T4 and V3, zones T3, T5 and V4 and the zones T1, U, V1 and V2 and thus the phase difference amount, that is, the amount of coma, is reduced. It should be noted that the variation of the voltage to be changed in this case is determined by the controller 27 supplied with a signal from the photodetector 36 and a predetermined potential with which the voltage will change by a predetermined amount is applied by the liquid crystal drive 44 to the zones T2, T4 and V3, zones T3, T5 and V4 and the zones T1, U, V1 and V2.

As above, in the liquid-crystal optical element 188, when the first optical disk 3 is loaded in the optical disk drive, the potential applied to the combination of the zones T1, U, V1 and V2, combination of the zones T2 and V3 and combination of the zones T3 and V4 of the second electrode 184 is changed. When the second optical disk 4 is loaded, the potential applied to the combination of the zones T1, U, V1 and V2, combination of the zones T2, T4 and V3 and combination of the zones T3, T5 and V4 of the second electrode 184 is changed. By controlling the voltage applied to the thirteenth electrode pattern, that is, the voltage applied to the zones resulted from division by these electrode patterns, the liquid-crystal optical element 188 can optimally adjust the coma with a simple control correspondingly to the type of an optical disk.

Since the optical pickup 181 according to the present invention is so controlled that a combination of those of the zones resulted from division by the first and twelfth spherical aberration-correcting electrode patterns in the liquid-crystal optical element 188, which are driven under the same condition, will be selected correspondingly to the type of an optical disk in consideration and a combination of those of the zones resulted from division by the thirteenth coma-correcting electrode pattern, which are driven under the same condition, will be selected correspondingly to the type of an optical disk in consideration, it is possible to correct spherical aberration and coma for the first and second optical disks different in format from each other.

In the optical pickup 181 constructed as above, the optical paths of light beams emitted from the first and second light sources 31 and 32 pass by the liquid-crystal optical element 188 (38 in the optical pickup 1) and are subjected to correction of spherical aberration, astigmatism and coma as in the optical pickup 1. So, the optical paths will not be described in detail.

In the optical pickup 181 according to the present invention, spherical aberration, astigmatism and coma can optimally be corrected by the single liquid-crystal optical element 188 without complicated electrode patterns in the liquid-crystal optical element 188 and also without complicated control of the liquid crystal drive 44 that drives the liquid-crystal optical element 188. That is, in the optical pickup 181 according to the present invention, the spherical aberration, astigmatism and coma can independently be controlled and corrected well by controlling each of the zones resulted from division by the electrode patterns. Thus, the electrode patterns in the liquid-crystal optical element can be simplified, the liquid-crystal optical element can be driven under a simpler control, and the spherical aberration, astigmatism and coma can optimally be corrected by the single liquid-crystal optical element to thereby record and/or reproduce data to and/or from the optical disk with an improved performance.

Also, in the optical pickup 181 according to the present invention, spherical aberration and coma can be corrected optimally for the first and second optical disks 3 and 4 different in format from each other. That is, the optical pickup 181 according to the present invention can record and/or reproduce data to and/or from such optical disks having the different formats with the improved performance and can have the optical elements and circuits thereof constructed more simply.

Further, the optical pickup 181 according to the present invention can be designed more compact through simplification of its construction.

Note that although in the aforementioned optical pickup 1 (81, 111, 131, 151 and 181), the liquid-crystal optical element 38 (88, 118, 138, 158 and 188) has provided at the side thereof where the forward traveling light is incident the first electrode 53 (113) having the electrode pattern to correct spherical aberration and electrode pattern to correct astigmatism or the first electrode 153 having the electrode pattern to correct astigmatism, and has also provided at the side thereof where the forward traveling light outgoes the second electrode 54 (84, 154 and 184) having the electrode pattern to correct spherical aberration and electrode pattern to correct coma, the present invention is not limited to this construction but the electrode patterns at the light-incident side and those at the light-outgoing side may be swapped with each other. That is, the liquid-crystal optical element may have provided at the side thereof where the forward traveling light is incident an electrode having an electrode pattern to correct spherical aberration and electrode pattern to correct coma, and has also provided at the side thereof where the forward traveling light outgoes an electrode having an electrode pattern to correct spherical aberration and electrode pattern to correct astigmatism or an electrode having an electrode pattern to correct astigmatism.

Next, there will be described operations of the optical disk drive 10 using the aforementioned optical pickup 1 to record and reproduce data to and from the optical disk 11. It should be noted that the following description also applies to the optical disk drive 10 using the optical pickup 81, 111, 131, 151 or 181. First, the operation of the optical pickup 1 for recording data to the optical disk 11 will be described.

The record button 25*b* is pressed by the user at the user's control unit 25 and data to be recorded is supplied to the input terminal 18 of the optical disk drive 10. The data to be recorded is subjected to error-correcting encoding in the error-correcting encoding circuit 19 correspondingly to the type of the optical disk 11, then modulated in the modulation circuit 20 correspondingly to the type of the optical disk 11, subjected to record-processing in the record processing circuit 21, and then supplied to the optical pickup 1. Then, the optical pickup 1 will irradiate a light beam having a predetermined wavelength from the semiconductor laser correspondingly to the type of the optical disk 11 to the recording layer of the optical disk 11, detects, by the photodetector, return light from the reflective layer of the optical disk 11, makes photoelectric conversion of the detected light and supplies the electric signal to the RF amplifier 15. The RF amplifier 15 generates a focus error signal, tracking error signal and RF signal which will be supplied to the servo circuit 16. The servo circuit 16 will generate focusing and tracking servo signals on the basis of the focus error signal, tracking error signal and RF signal supplied from the RF amplifier 15, and supplies the signals to the drive circuit of the objective lens driving mechanism of the optical pickup 1. Thus, the objective lens is moved by the objective lens driving mechanism in a focusing direction parallel to the optical axis thereof and a tracking direction perpendicular to the optical axis on the basis of the focusing and tracking servo signals. Further, the motor control circuit 13 generates a rotation servo signal so that a clock generated based on an addressing pit will be synchronous with a reference clock from the crystal oscillator. The spindle motor 12 is driven based on the rotation servo signal to rotate the optical disk 11 at a CLV. Then, the subcode extraction circuit 17 extracts address data on the lead-in area such as pit pattern from the RF signal, and supplies it to the control circuit 27.

The optical pickup 1 is controlled by the control circuit 27 to access a predetermined address on the basis of the extracted address data to record data having been record-processed in the record processing circuit 21, drives the semiconductor laser at the record level and emits a light beam to the recording layer of the optical disk 11 for record of the data to be recorded. As the data to be recorded is recorded to the optical disk 11, the optical pickup 1 is fed sequentially by the thread motor 28 to record the data to an area between the inner and outer radii of the optical disk 11.

Next, the operation of the optical pickup 1 for reproducing data recorded in the optical disk 11 will be described.

The user presses the play button 25c at the user's control unit 25. As in the recording operation, the optical pickup 1 will irradiate a light beam having a predetermined wavelength from the semiconductor laser correspondingly to the type of the optical disk 11 to the recording layer of the optical disk 1, detects, by the photodetector, return light from the reflective layer of the optical disk 11, makes photoelectric conversion of the detected light and supplies the electric signal to the RF amplifier 15. The RF amplifier 15 generates a focus error signal, tracking error signal and RF signal which will be supplied to the servo circuit 16. The servo circuit 16 will generate focusing and tracking servo signals on the basis of the focus error signal, tracking error signal and RF signal supplied from the RF amplifier 15. The objective lens is controlled for focusing and tracking on the basis of these signals. Further, the motor control circuit 13 generates a rotation servo signal so that a clock generated based on a sync signal will be synchronous with a reference clock from the crystal oscillator. The spindle motor 12 is driven based on the rotation servo signal to rotate the optical disk 11 at a CLV. Also, the subcode extraction circuit 17 extracts subcode data from the RF signal and supplies the extracted subcode data to the control circuit 27. To reproduce predetermined data, the optical disk 1 accesses a predetermined address on the basis of address data included in the extracted subcode data, drives the semiconductor laser at the reproduction level and emits a light beam to the recording layer of the optical disk 11, detects return light from the reflective layer. Thus, the optical pickup 1 reproduces data recorded in the optical disk 11. As the data is reproduced from the optical disk 11, the optical pickup 1 is fed sequentially by the thread motor 28 to reproduce data recorded in an area between the inner and outer radii of the optical disk 11.

The RF signal generated by the RF amplifier 15 is demodulated in the demodulation circuit 22 correspondingly to the modulation made on the data when recorded, it is subjected to error-correcting decoding in the error-correcting decoding circuit 23 and delivered at the output terminal 24. Thereafter, the data delivered at the output terminal 24 is supplied as it is (in the digital state) or converted from digital to analog in a D-A converter and outputted from a speaker, monitor or the like.

As having been described in the foregoing, the optical disk drive 10 according to the present invention can record and reproduce data with an improved performance through an appropriate correction of spherical aberration for each of different formats of the optical disk 11 by the simply constructed liquid-crystal optical element 38 (88, 118, 138, 158 and 188) and without any complicated control of the liquid crystal drive 44 that drives the liquid-crystal optical element 38 (88, 118, 138, 158 and 188).

The optical pickup 1 (81, 111, 131, 151 and 181) according to the present invention is used in an optical disk drive for data recording and reproduction. However, the optical pickup 1 may be adopted in a write-only or read-only optical disk drive. Also, the present invention is applicable to other than the aforementioned disk formats.

It should be understood by those skilled in the art that various modifications, combinations, sub-combinations and alterations may occur depending on design requirements and other factors insofar as they are within the scope the appended claims or the equivalents thereof.

What is claimed is:

1. An optical pickup comprising:
   a light source to emit a light beam of a predetermined wavelength;
   an objective lens to focus the light beam emitted from the light source onto the signal recording surface of an optical disk;
   a liquid-crystal optical element provided between the light source and objective lens to correct spherical aberration, astigmatism and coma by varying a refractive index of the liquid-crystal optical element; and
   a photodetector to detect return light from the signal recording surface of the optical disk,
   the liquid-crystal optical element having a pair of electrodes disposed opposite to each other in the optical-axial direction; and
   the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma,
   wherein one of the pair of electrodes has a first pattern that divides the one electrode into a plurality of zones to correct spherical aberration and a second pattern disposed outside the first pattern to correct astigmatism; and
   the other electrode has a third pattern that divides the other electrode into a plurality of zones to correct spherical aberration and a fourth pattern disposed outside and inside the third pattern to correct coma.

2. The optical pickup according to claim 1, further comprising a controller to control, based on a signal detected by the photodetector, a potential applied to each of the zones resulting from division of the one and other electrodes of the liquid-crystal optical element,
   in the liquid-crystal optical element, the controller controlling the potential applied to each of the zones resulting from division by the first and third patterns to correct spherical aberration, the potential applied to each of the zones resulting from division by the second pattern to correct astigmatism, and the potential applied to each of the zones resulting from division by the fourth pattern to correct coma.

3. The optical pickup according to claim 1, wherein:
   the first pattern includes a plurality of concentric patterns that divides the one electrode into a plurality of zones; and
   the third pattern includes a plurality of concentric patterns that divides the other electrode into a plurality of zones.

4. An optical pickup for recording and/or reproducing information to and/or from a first optical disk of one type and a second optical disk of the other type, the optical pickup comprising:
   a first light source to emit a light beam of a first wavelength;
   a second light source to emit a light beam of a second wavelength different from the first wavelength;

an objective lens to focus the light beam emitted from the first or second light source onto the signal recording surface of the optical disk;

a liquid-crystal optical element provided between the first and second light sources and the objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct spherical aberration and a second pattern disposed outside the first pattern to correct astigmatism; and the other electrode has a third pattern that divides the other electrode into a plurality of zones to correct spherical aberration and a fourth pattern disposed outside and inside the third pattern to correct coma.

5. The optical pickup according to claim 4, wherein:

the liquid-crystal optical element corrects spherical aberration by varying a potential applied to each of the zones resulting from division by the first pattern and each of the zones resulting from division by the third pattern; and a combination of zones resulting from division by the first pattern and zones resulting from division by the third pattern to be driven under similar conditions, is selected according to the type of an optical disk.

6. The optical pickup according to claim 4, wherein:

the liquid-crystal optical element corrects coma by varying a potential applied to each of the zones resulting from division by the fourth pattern; and a combination of zones resulting from division by the fourth pattern to be driven under similar conditions, is selected according to the type of an optical disk.

7. The optical pickup according to claim 5 or 6, further comprising a disk discriminator to discriminate the type of an optical disk on the basis of a signal detected by the photodetector, wherein the combination of zones to be driven under similar conditions is selected according to the type of the optical disk identified by the disk discriminator.

8. An optical disk drive including an optical pickup for recording and/or reproducing information to an optical disk and a disk rotation driving unit for rotating the optical disk, the optical pickup comprising:

a light source to emit a light beam of a predetermined wavelength;

an objective lens to focus the light beam emitted from the light source onto the signal recording surface of an optical disk;

a liquid-crystal optical element provided between the light source and objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct spherical aberration and a second pattern disposed outside the first pattern to correct astigmatism; and the other electrode has a third pattern that divides the other electrode into a plurality of zones to correct spherical aberration and a fourth pattern disposed outside and inside the third pattern to correct coma.

9. An optical disk drive including an optical pickup for recording and/or reproducing information to first and second disks and a disk rotation driving unit for rotating the first or second optical disk, the optical pickup comprising:

a first light source to emit a light beam of a first wavelength;

a second light source to emit a light beam of a second wavelength different from the first wavelength;

an objective lens to focus the light beam emitted from the first or second light source onto the signal recording surface of the optical disk;

a liquid-crystal optical element provided between the first and second light sources and the objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct spherical aberration and a second pattern disposed outside the first pattern to correct astigmatism; and the other electrode has a third pattern that divides the other electrode into a plurality of zones to correct spherical aberration and a fourth pattern disposed outside and inside the third pattern to correct coma.

10. An optical pickup comprising:

a light source to emit a light beam of a predetermined wavelength;

an objective lens to focus the light beam emitted from the light source onto the signal recording surface of an optical disk;

a liquid-crystal optical element provided between the light source and objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct astigmatism; and the other electrode has a second pattern that divides the other electrode into a plurality of zones to correct spherical aberration and a third pattern that divides the other electrode into a plurality of zones to correct coma.

11. An optical pickup for recording and/or reproducing information to and/or from a first optical disk of one type and a second optical disk of the other type, the optical pickup comprising:

a first light source to emit a light beam of a first wavelength;

a second light source to emit a light beam of a second wavelength different from the first wavelength;

an objective lens to focus the light beam emitted from the first or second light source onto the signal recording surface of the optical disk;

a liquid-crystal optical element provided between the first and second light sources and the objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct spherical aberration; and the other electrode has a second pattern that divides the other electrode into a plurality of zones to correct spherical aberration and a third pattern that divides the other electrode into a plurality of zones to correct coma.

12. An optical disk drive including an optical pickup for recording and/or reproducing information to an optical disk and a disk rotation driving unit for rotating the optical disk, wherein:

the optical pickup comprising:

a light source to emit a light beam of a predetermined wavelength;

an objective lens to focus the light beam emitted from the light source onto the signal recording surface of an optical disk;

a liquid-crystal optical element provided between the light source and objective lens to correct spherical aberration, astigmatism and coma by varying a refractive index of the liquid-crystal optical element; and a photodetector to detect return light from the signal recording surface of the optical disk, the liquid-crystal optical element having a pair of electrodes disposed opposite to each other in the optical-axial direction; and the liquid-crystal optical element having a pattern to correct spherical aberration, a pattern to correct astigmatism and a pattern to correct coma, the patterns being disposed dispersedly on the pair of electrodes to divide the electrode pair into a plurality of zones, and the plurality of zones resulting from division of the electrode pair by the patterns being used in combination to correct the spherical aberration, astigmatism and coma, wherein one of the pair of electrodes has a first pattern that divides the one electrode into a plurality of zones to correct spherical aberration; and the other electrode has a second pattern that divides the other electrode into a plurality of zones to correct spherical aberration and a third pattern that corrects coma.

13. The optical pickup according to claim 11, wherein:

the liquid-crystal optical element corrects spherical aberration by varying the potential applied to each of the zones resulting from division by the second pattern; and a combination of zones of the liquid-crystal optical element resulting from division by the second pattern to be driven under similar conditions is selected according to the type of an optical disk.

14. The optical pickup according to claim 11, wherein:

the liquid-crystal optical element corrects coma by varying the potential applied to each of the zones resulting from division by the third pattern; and a combination of zones of the liquid-crystal optical element resulting from division by the third pattern to be driven under similar conditions is selected according to the type of an optical disk.

15. The optical pickup according to claim 13 or 14, further comprising a disk discriminator to discriminate the type of an optical disk on the basis of a signal detected by the photodetector, where the combination of zones to be driven under similar conditions is selected according to the type of the optical disk identified by the disk discriminator.

* * * * *